(12) United States Patent
Tanigawa et al.

(10) Patent No.: US 11,130,274 B2
(45) Date of Patent: Sep. 28, 2021

(54) FILAMENT WINDING APPARATUS

(71) Applicant: Murata Machinery, Ltd., Kyoto (JP)

(72) Inventors: Motohiro Tanigawa, Kyoto (JP); Tadashi Uozumi, Kyoto (JP); Tetsuya Matsuura, Kyoto (JP); Hirotaka Wada, Kyoto (JP); Tatsuhiko Nishida, Kyoto (JP); Shu Ikezaki, Kyoto (JP); Daigoro Nakamura, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 175 days.

(21) Appl. No.: 16/488,424

(22) PCT Filed: Mar. 15, 2018

(86) PCT No.: PCT/JP2018/010270
§ 371 (c)(1),
(2) Date: Aug. 23, 2019

(87) PCT Pub. No.: WO2018/173927
PCT Pub. Date: Sep. 27, 2018

(65) Prior Publication Data
US 2020/0001519 A1    Jan. 2, 2020

(30) Foreign Application Priority Data

Mar. 21, 2017 (JP) .............................. JP2017-054280

(51) Int. Cl.
*B29C 65/02* (2006.01)
*B29C 53/80* (2006.01)
(Continued)

(52) U.S. Cl.
CPC ........ *B29C 53/8016* (2013.01); *B29C 53/602* (2013.01); *B29C 70/16* (2013.01);
(Continued)

(58) Field of Classification Search
CPC ..... B29C 63/24; B29C 70/32; B29C 53/8016; B29C 63/0073; B29C 53/56; B29C 70/16;
(Continued)

(56) References Cited

U.S. PATENT DOCUMENTS 9,636,874 B2 * 5/2017 Hatta .................. B29C 53/8016
2013/0068873 A1   3/2013 Tanigawa et al.
(Continued)

FOREIGN PATENT DOCUMENTS

DE            3843488 A1    7/1990
JP         60-139996 U      9/1985
(Continued)

OTHER PUBLICATIONS

Notification of Reason for Refusal dated May 20, 2020, of counterpart Korean Application No. 10-2019-7024593, along with an English translation.

*Primary Examiner* — Vishal I Patel
(74) *Attorney, Agent, or Firm* — DLA Piper LLP (US)

(57) ABSTRACT

A filament winding apparatus includes a working area in which an operator performs an operation to at least one bobbin and/or liner on a conveyance path, an operation area in which a winder is driven, a buffer area between the working area and the operation area in a conveyance direction on the conveyance path, and an outside area that is neither the working area, the operation area, nor the buffer area being provided; and first fixed fences provided at borders between (i) the operation area and the buffer area and (ii) the working area and at the borders between (I) the operation area and the buffer area and (II) the outside area; and a first door provided at a border between the working area and the buffer area, and wherein the buffer area includes an accumulator portion capable of accumulating the at least one bobbin and the liner.

20 Claims, 41 Drawing Sheets

(51) Int. Cl.
*B29C 53/60* (2006.01)
*B29C 70/16* (2006.01)
*B29C 70/32* (2006.01)
*B65H 67/06* (2006.01)
*F17C 1/06* (2006.01)
*B65H 67/02* (2006.01)

(52) U.S. Cl.
CPC ............ *B29C 70/32* (2013.01); *B65H 67/02* (2013.01); *B65H 67/06* (2013.01); *F17C 1/06* (2013.01); *F17C 2209/2154* (2013.01); *F17C 2221/012* (2013.01); *F17C 2270/0184* (2013.01)

(58) Field of Classification Search
CPC .... B29C 53/602; F17C 2223/036; F17C 1/06; F17C 2221/012; F17C 2209/2154; F17C 2270/0184; Y02E 60/32; B65H 67/06; B65H 67/02; B29L 2031/7156
See application file for complete search history.

(56) References Cited

U.S. PATENT DOCUMENTS

| 2014/0263802 A1 | 9/2014 | Tanigawa et al. |
| 2015/0048195 A1 | 2/2015 | Tanigawa et al. |

FOREIGN PATENT DOCUMENTS

| JP | 8-113312 A | 5/1996 |
| JP | 2002-029653 A | 1/2002 |
| JP | 2006-21322 A | 1/2006 |
| JP | 2009-66818 A | 4/2009 |
| JP | 2009-083064 A | 4/2009 |
| JP | 5687981 B2 | 3/2015 |
| JP | 5752627 B2 | 7/2015 |
| JP | 5756821 B2 | 7/2015 |
| KR | 10-2009-0033792 A | 4/2009 |

\* cited by examiner

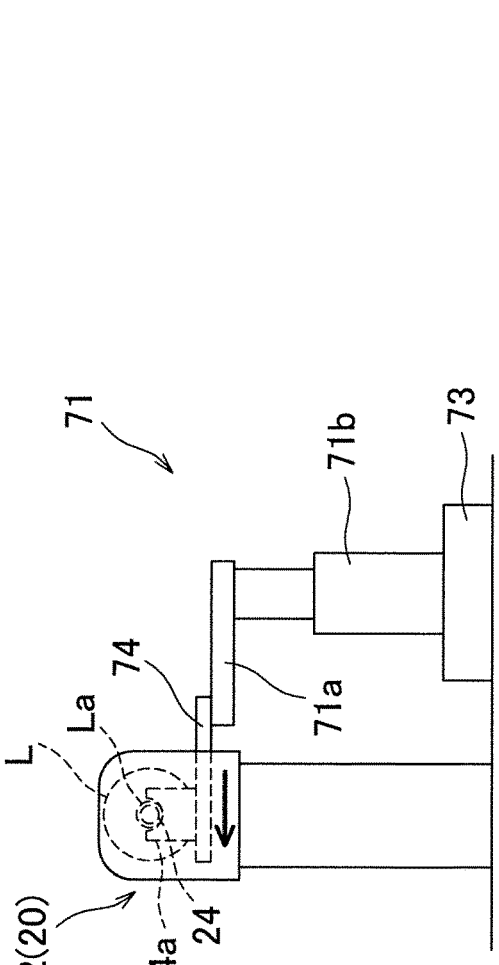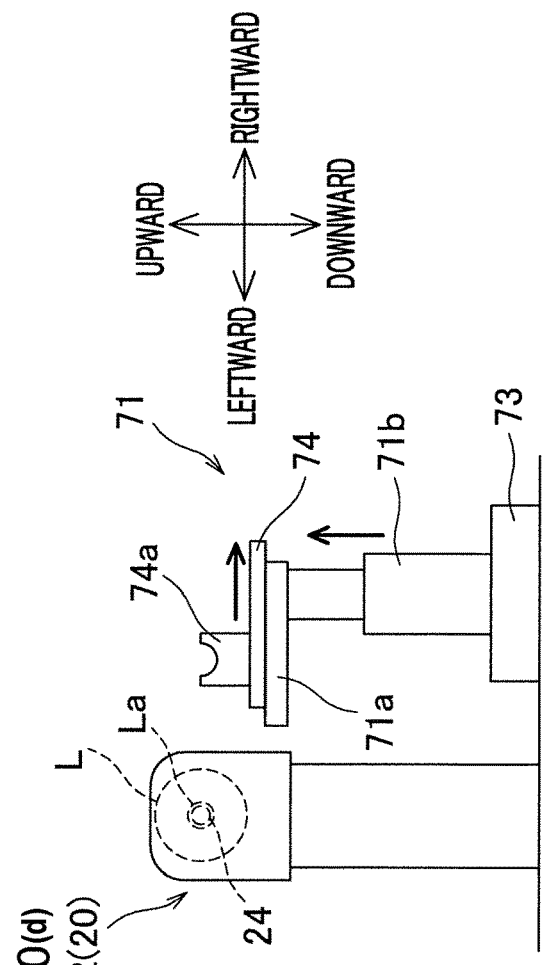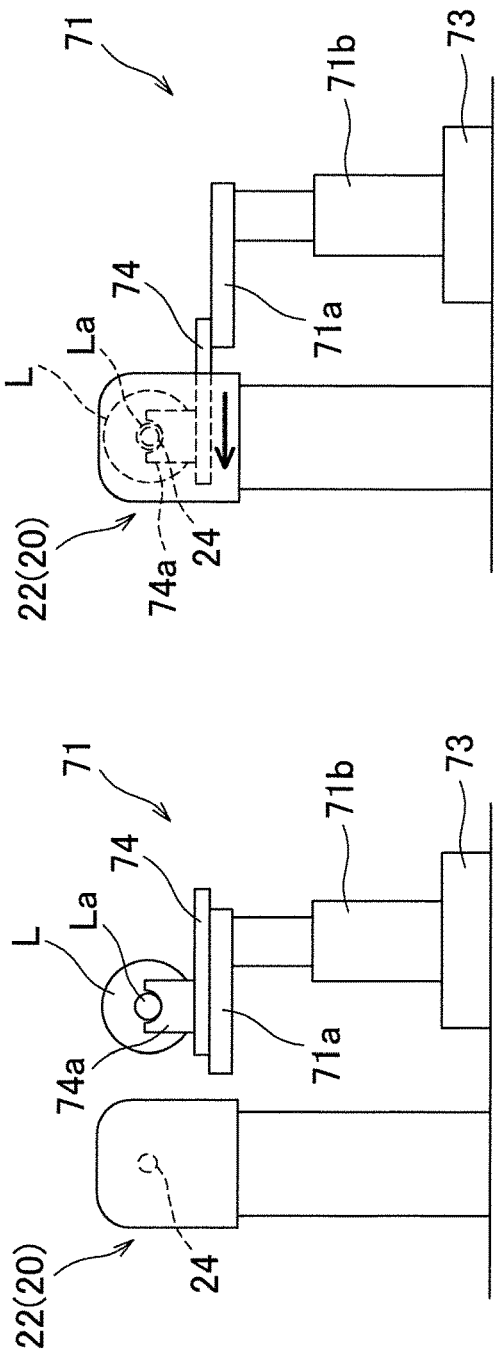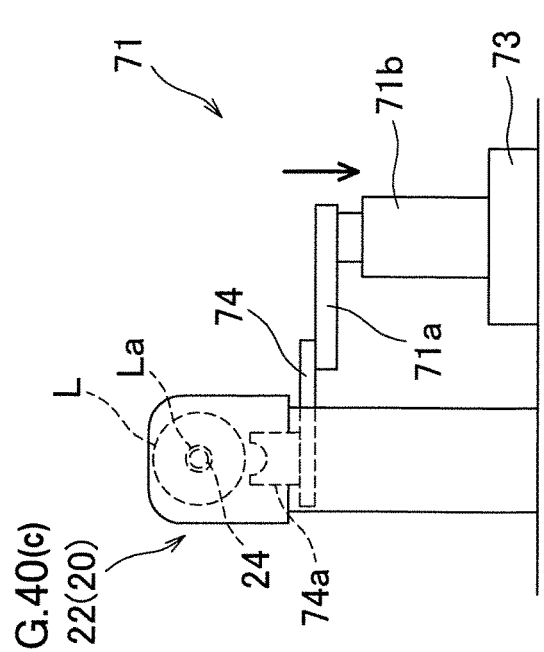

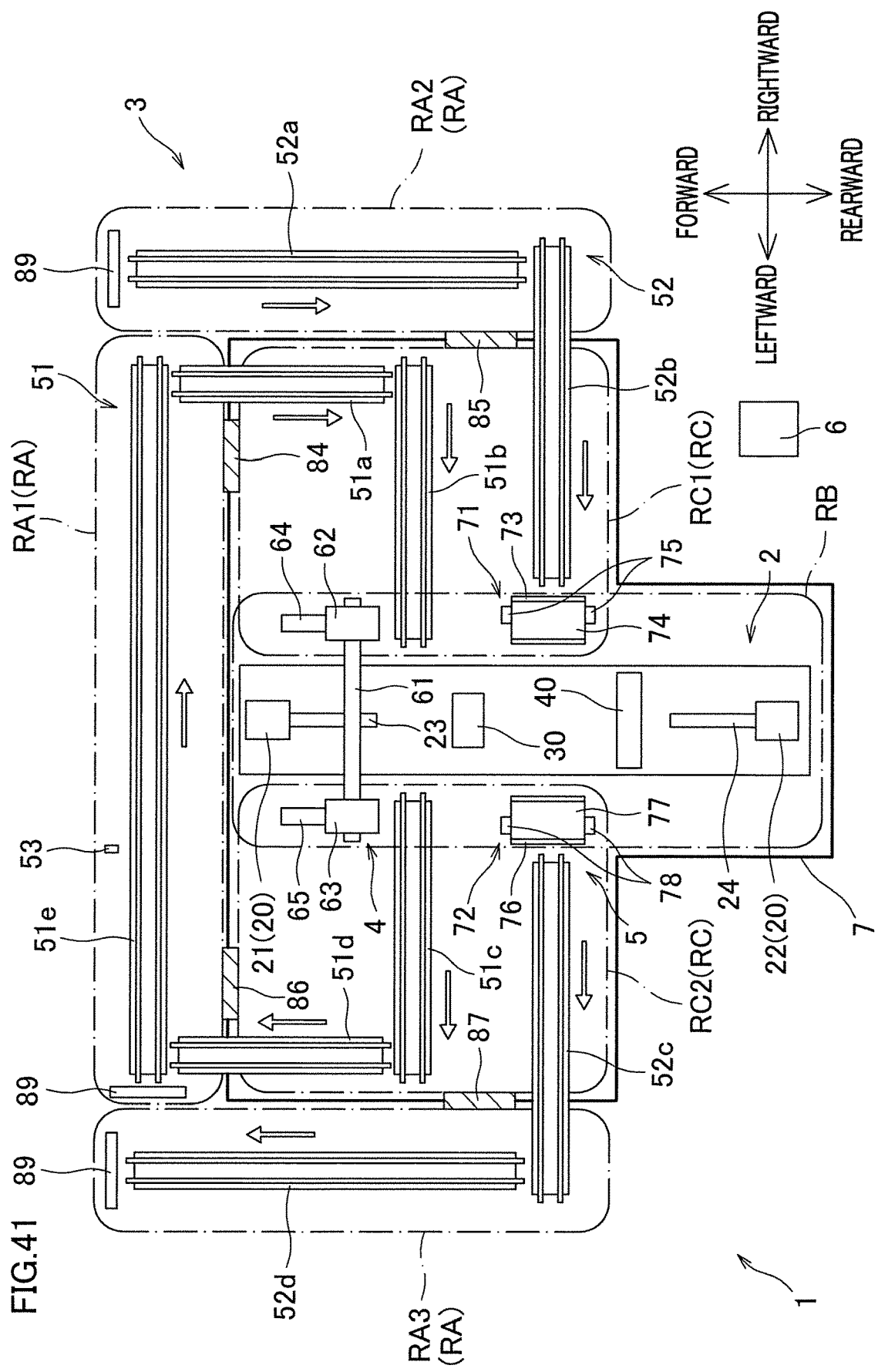

FILAMENT WINDING APPARATUS

TECHNICAL FIELD

This disclosure relates to a filament winding apparatus.

BACKGROUND

A filament winding apparatus configured to produce a pressure vessel by winding a fiber bundle onto a liner has been known. In such a filament winding apparatus, automation and optimization of various types of operations are implemented to improve the efficiency of winding. For example, Japanese Patent No. 5756821 discloses automated replacement of the liner. The filament winding apparatus disclosed by Japanese Patent No. 5756821 includes a hoop winding unit that executes hoop-winding to a liner by revolving a bobbin, on which a fiber bundle is wound, around the liner. According to Japanese Patent No. 5687981 and Japanese Patent No. 5752627, to improve the efficiency in replacement of the bobbin attached to the hoop winding unit (hoop winding apparatus in Japanese Patent No. 5687981 and Japanese Patent No. 5752627), plural hoop winding units are prepared, and the bobbin is replaced together with the hoop winding unit.

In Japanese Patent No. 5756821, Japanese Patent No. 5687981 and Japanese Patent No. 5752627, an operator is still required to perform operations such as supplementation of the liners and the attachment/detachment of the bobbins. The operator, however, should not perform such operations in the vicinity of the hoop winding unit or the like for safety reasons because the hoop winding unit or the like may be driven at high speed depending on the winding condition of the fiber bundle. Meanwhile, if the hoop winding unit or the like is stopped each time the operator performs the operations to improve safety, efficiency of the winding is deteriorated.

It could therefore be helpful to provide a filament winding apparatus with which safety of an operator and improvement in efficiency of winding are both achieved.

SUMMARY

We thus provide:

A filament winding apparatus including: a winder which detachably supports at least one bobbin on each of which a fiber bundle is wound and is configured to wind the fiber bundle taken out from the bobbin onto a liner; and a conveyance device including a conveyance path through which the at least one bobbin and the liner are carried in and out from the winder, in the filament winding apparatus, a working area in which an operator performs an operation to the at least one bobbin and/or the liner on the conveyance path, an operation area in which the winder is driven, a buffer area which is between the working area and the operation area in a conveyance direction on the conveyance path, and an outside area which is neither the working area, the operation area, nor the buffer area being provided, the filament winding apparatus further comprising: first fixed fences provided at borders between (i) the operation area and the buffer area and (ii) the working area and at the borders between (I) the operation area and the buffer area and (II) the outside area; and a first door provided at a border between the working area and the buffer area, and wherein, the buffer area includes an accumulator portion which is capable of accumulating the at least one bobbin and the liner.

When the winder is stopped due to maintenance or the like, the operator is allowed to enter the operation area and the buffer area from the working area through the first door. Meanwhile, because the first fixed fence is provided, it is possible to prevent the operator from carelessly entering the operation area and the buffer area from the working area while the winder is in operation. Because it is possible to prevent the operator from approaching the winder in operation, the safety of the operator is ensured. Furthermore, because in the buffer area the accumulator portion is provided to be able to accumulate the bobbin and the liner, the winding can be continued by using the bobbin and the liner accumulated in the accumulator portion, even when the operator is performing an operation in the working area. As such, it is possible to achieve both safety of the operator and improvement in efficiency of the winding.

A second fixed fence and a second door may be provided at a border between the working area and the outside area. In this regard, the second door must be opened when the operator enters the working area from the outside area. The safety is therefore further improved by properly controlling the first door in accordance with the state of the second door.

An unlocking operation unit operated by an operator to unlock the second door; and a control unit configured to control the first door and the second door may be further included, and when the unlocking operation unit is operated, the control unit may unlock the second door and lock the first door.

With this arrangement, after the operator unlocks the second door and enters the working area, the first door is locked and the operator cannot enter the buffer area from the working area. This ensures prevention of the operator from entering the buffer area while the winder is in operation.

A locking operation unit operated by the operator from the outside area to lock the second door may be further provided, and the control unit may maintain the first door in a locked state during a period after operation of the unlocking operation unit and before operation of the locking operation unit.

With this arrangement, the first door is not unlocked unless the operator goes out from the working area to the outside area and instructs locking to the locking operation unit. This further ensures prevention of the operator from entering the buffer area while the winder is in operation.

A human detection unit capable of detecting the operator in the working area may be further provided. With this arrangement, safety is further improved by properly controlling the first door in accordance with the state of detection by the human detection unit.

A control unit configured to control the first door may be further provided and, when the human detection unit detects that the operator is in the working area, the control unit may lock the first door.

With this arrangement, when the operator is in the working area, the first door is locked and the operator cannot enter the buffer area from the working area. This ensures prevention of the operator from entering the buffer area while the winder is in operation.

The winder may detachably support a cartridge to which a plurality of the at least one bobbin are attached, and the conveyance device may carry the cartridge in and out from the winder.

In this way, when the cartridge to which the bobbins are attached is replaced altogether, the replacement of the bobbins can be done in a short time.

The first door in an open state may be sized to allow at least one of the cartridge or the liner to pass through the first door. With this arrangement, when the cartridge or the liner is large in size, the first door is not only used to convey the cartridge and the liner from the working area to the buffer area, but also allow the operator to go in and out.

The fiber bundle may be wound onto the liner which is used as a hydrogen tank mounted on a fuel cell vehicle.

When the liner is the hydrogen tank mounted on the fuel cell vehicle, the liner is required to be large to some degree. Hence, the winder and the conveyance device are large in size. The safety is therefore important, and our apparatus by which high level safety is achieved is particularly effective.

BRIEF DESCRIPTION OF THE DRAWINGS

FIGS. 40(a)-40(d) are front views schematically showing the action of a carrying-in carrier.

FIG. 41 is a plan view showing a modification of the filament winding apparatus.

REFERENCE SIGNS LIST 1 filament winding apparatus
2 winder
3 conveyance device
6 controller (control unit)
7 first safety fence (first fixed fence)
8 second safety fence (second fixed fence)
9 operation unit (unlocking operation unit, locking operation unit)
33 bobbin
51 cartridge conveyance path (conveyance path)
52 liner conveyance path (conveyance path)
81 to 83 doors (second doors)
84 to 87 doors (first doors)
89 human detection sensor (human detection unit)
C cartridge
L liner
RA (RA1, RA2, RA3) working area
RB operation area
RC (RC1, RC2) buffer area

DETAILED DESCRIPTION

Example

Filament Winding Apparatus

Figure 1:
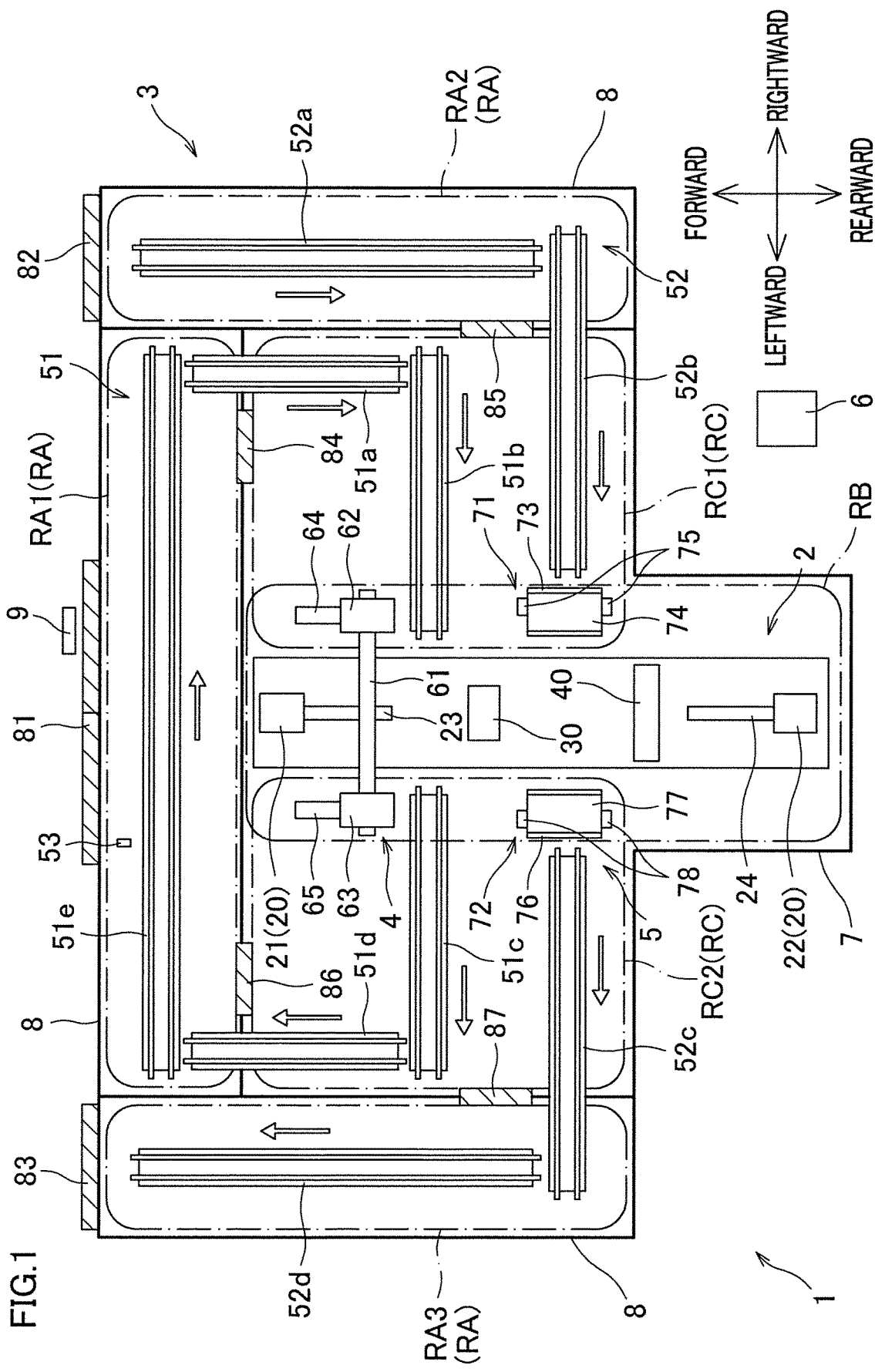
FIG. 1 is a plan view that outlines a filament winding apparatus.

The following will describe a filament winding apparatus of an example with reference to the figures. As shown in FIG. 1, the filament winding apparatus 1 includes a winder 2, a conveyance device 3, a cartridge replacing device 4, a liner replacing device 5, and a controller 6. Operations of the winder 2, the conveyance device 3, the cartridge replacing device 4, and the liner replacing device 5 are controlled by the controller 6. Hereinafter, directions shown in FIG. 1 will be consistently used for convenience of explanation. On the whole, the filament winding apparatus 1 is arranged to be substantially symmetrical in the left-right direction.

Winder

Figure 2:
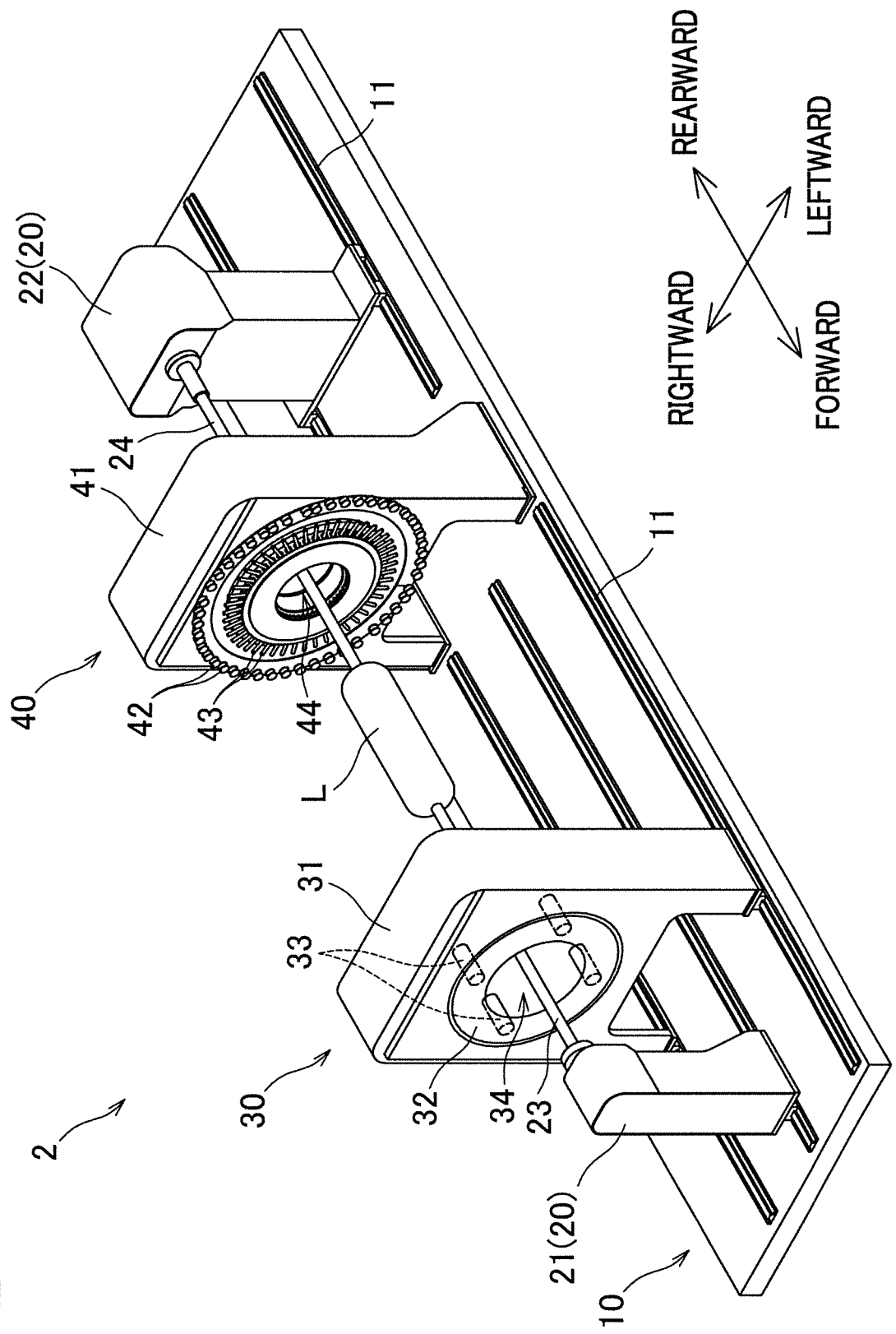
FIG. 2 is a perspective view showing a winder.

The winder 2 is configured to wind fiber bundles (not illustrated) onto a liner L. Each fiber bundle is formed by, for example, impregnating a thermosetting or thermoplastic synthetic resin material into a fiber material such as carbon fiber. When a pressure vessel (pressure tank) is manufactured by the winder 2, the liner L is shaped to have a cylindrical part and dome parts on both sides of the cylindrical part as shown in FIG. 2. The liner L is made of a material such as high-strength aluminum, metal, and resin. After the fiber bundles are wound onto the liner L, a hardening process such as baking and cooling is performed. As a result, a high-strength pressure vessel is obtained. The winder 2 manufactures a hydrogen tank mounted on a fuel cell vehicle, by winding the fiber bundles onto the liner L. The liner L is, for example, a large liner which is about 200 millimeters in diameter and about 1 meter in length.

The following will detail the winder 2 with reference to FIG. 2. The winder 2 includes a base 10, liner supporting units 20 (first liner supporting unit 21 and a second liner supporting unit 22), a hoop winding unit 30, and a helical winding unit 40.

The base 10 supports the liner supporting units 20, the hoop winding unit 30, and the helical winding unit 40. On the top surface of the base 10, rails 11 are provided to extend in the front-rear direction. The liner supporting units 20 and the hoop winding unit 30 are provided on the rails 11 and capable of reciprocating in the front-rear direction on the rails 11. Meanwhile, the helical winding unit 40 is fixed to the base 10. The first liner supporting unit 21, the hoop winding unit 30, the helical winding unit 40, and the second liner supporting unit 22 are provided in this order from the front-side to the rear-side.

The liner supporting units 20 include the first liner supporting unit 21 provided in front of the hoop winding unit 30 and the second liner supporting unit 22 provided behind the helical winding unit 40. The first liner supporting unit 21 includes a supporting shaft 23 that extends in the axial direction (front-rear direction) of the liner L, whereas the second liner supporting unit 22 includes a supporting shaft 24 that extends in the axial direction of the liner L. The liner supporting units 20 support, by the supporting shafts 23 and 24, the liner L to be axially rotatable. The liner supporting units 20 allow the liner L to be automatically attachable and detachable by, for example, the disclosure of Japanese Patent No. 5756821.

The hoop winding unit 30 is configured to hoop-wind the fiber bundles onto the liner L. The hoop-winding is a way of winding the fiber bundles onto the liner L in a direction substantially orthogonal to the axial direction (or in a direction slightly tilted with respect to the plane orthogonal to the axial direction). The hoop winding unit 30 includes a main body 31, a rotating member 32, and bobbins 33. The main body 31 is provided on the rails 11 and supports the rotating member 32 to be rotatable about the axis of the liner L. At a central portion of the disc-shaped rotating member 32, a circular passing hole 34 is formed to allow the liner L to pass therethrough. The rotating member 32 detachably supports the bobbins 33. The bobbins 33 are provided along the circumference of the rotating member 32 at regular intervals, and fiber bundles are wound onto the respective bobbins 33. The rotating member 32 is rotated while the hoop winding unit 30 is reciprocated along the rails 11 so that the liner L relatively passes through the passing hole 34. As a result, the bobbins 33 revolve around the liner L about the axis of the liner L, and the fiber bundles taken out from the bobbins 33 are hoop-wound onto the surface of the liner L.

The helical winding unit 40 is configured to helical-wind the fiber bundles onto the liner L. The helical-winding is a way of winding the fiber bundles onto the liner L in a direction substantially parallel to the axial direction (or in a direction slightly tilted with respect to the axial direction). The helical winding unit 40 includes a main body 41, a large number of guides 42, and a larger number of nozzles 43. The main body 41 is fixed to the base 10. At a central portion of the main body 41, a circular passing hole 44 is formed to allow the liner L to pass therethrough. The large number of guides 42 and the large number of nozzles 43 are provided along the circumference of the passing hole 44. A large number of fiber bundles taken out from a large number of bobbins provided at an unillustrated creel stand are led into a large number of nozzles 43 via the large number of guides 42. As the nozzles 43 extend in radial directions, the fiber bundles are led radially inward from the radial outside. Each nozzle 43 includes plural tubular members that are coaxial, nested, and different in diameter, and is radially extendable and contractable. The large number of nozzles 43 are extended and contracted in accordance with the outer shape of the liner L while the liner supporting units 20 are reciprocated along the rails 11 so that the liner L passes through the passing hole 44. As a result, a large number of fiber bundles taken out from the large number of nozzles 43 are simultaneously helical-wound onto the surface of the liner L.

Conveyance Device

Referring back to FIG. 1, the conveyance device 3 is configured to carry a cartridge C (see FIG. 3) and the liner L (see FIG. 3) in and out from the winder 2. The conveyance device 3 includes a cartridge conveyance path 51 through which the cartridge C is carried in and out from the winder 2 and a liner conveyance path 52 through which the liner L is carried in and out from the winder 2. Outlined arrows in FIG. 1 indicate the conveyance direction of the cartridge C on the cartridge conveyance path 51 and the conveyance direction of the liner L on the liner conveyance path 52. Hereinafter, the upstream and downstream in the conveyance direction will be simply referred to as upstream and downstream.

The cartridge C is a unit including bobbins 33. To be more specific, the cartridge C is arranged so that the bobbins 33 are attachable to the circumference of a disc-shaped supporting member, and the supporting member is attachable to and detachable from the rotating member 32 of the hoop winding unit 30. In this example, the bobbins 33 of the hoop winding unit 30 are replaced by replacing the cartridge C. The cartridge C may be differently structured, and the bobbins 33 may be replaced one by one.

The cartridge conveyance path 51 includes cartridge carrying-in conveyers 51a and 51b by which the cartridge C is carried in the winder 2, cartridge carrying-out conveyers 51c and 51d by which the cartridge C is carried out from the winder 2, and a connection conveyor 51e connecting the cartridge carrying-out conveyer 51d to the cartridge carrying-in conveyer 51a. When the cartridge C is supplied to the connection conveyor 51e, the supplied cartridge C is carried to the vicinity of the cartridge replacing device 4 via the cartridge carrying-in conveyers 51a and 51b, and then attached to the hoop winding unit 30 by the cartridge replacing device 4. Meanwhile, the cartridge C detached from the hoop winding unit 30 by the cartridge replacing device 4 is moved to the cartridge carrying-out conveyer 51c by the cartridge replacing device 4, and carried to the connection conveyor 51e via the cartridge carrying-out conveyor 51d.

A stopper 53 is provided at a non-end part of the connection conveyor 51e. The stopper 53 is switchable between a blocked state (e.g., shown in FIG. 6) in which the connection conveyor 51e is blocked and an open state (e.g., shown in FIG. 1) in which the connection conveyor 51c is open. When the connection conveyor 51e is blocked by the stopper 53, the cartridge C conveyed from the winder 2 is accumulated at a part upstream of the stopper 53 on the connection conveyor 51e.

The liner conveyance path 52 includes liner carrying-in conveyors 52a and 52b by which the liner L is carried in the winder 2 and liner carrying-out conveyors 52c and 52d by which the liner L is carried out from the winder 2. When the liner L is supplied to the liner carrying-in conveyor 52a, the supplied liner L is carried to the vicinity of the liner replacing device 5 via the liner carrying-in conveyor 52b. The supplied liner L is moved by the liner replacing device 5 to a location where the liner L is connectable to the supporting shafts 23 and 24 of the liner supporting units 20, and attached to the liner supporting units 20. Meanwhile, the liner L detached from the supporting shafts 23 and 24 of the liner supporting units 20 is moved to the liner carrying-out conveyor 52c by the liner replacing device 5, and conveyed to the liner carrying-out conveyor 52d.

Cartridge Replacing Device

The cartridge replacing device 4 is configured to replace the cartridge C attached to the hoop winding unit 30. The cartridge replacing device 4 includes a supporting shaft 61, sliders 62 and 63, a carrying-in retaining member 64, and a carrying-out retaining member 65. The supporting shaft 61 is provided to extend in the left-right direction and to be positioned not to obstruct the movement of the first liner supporting unit 21. To the supporting shaft 61, the sliders 62 and 63 are attached to be movable in the left-right direction along the supporting shaft 61. To the right slider 62, the carrying-in retaining member 64 is attached to be movable in the front-rear direction relative to the slider 62. To the left slider 63, the carrying-out retaining member 65 is attached to be movable in the front-rear direction relative to the slider 63.

Figure 7:
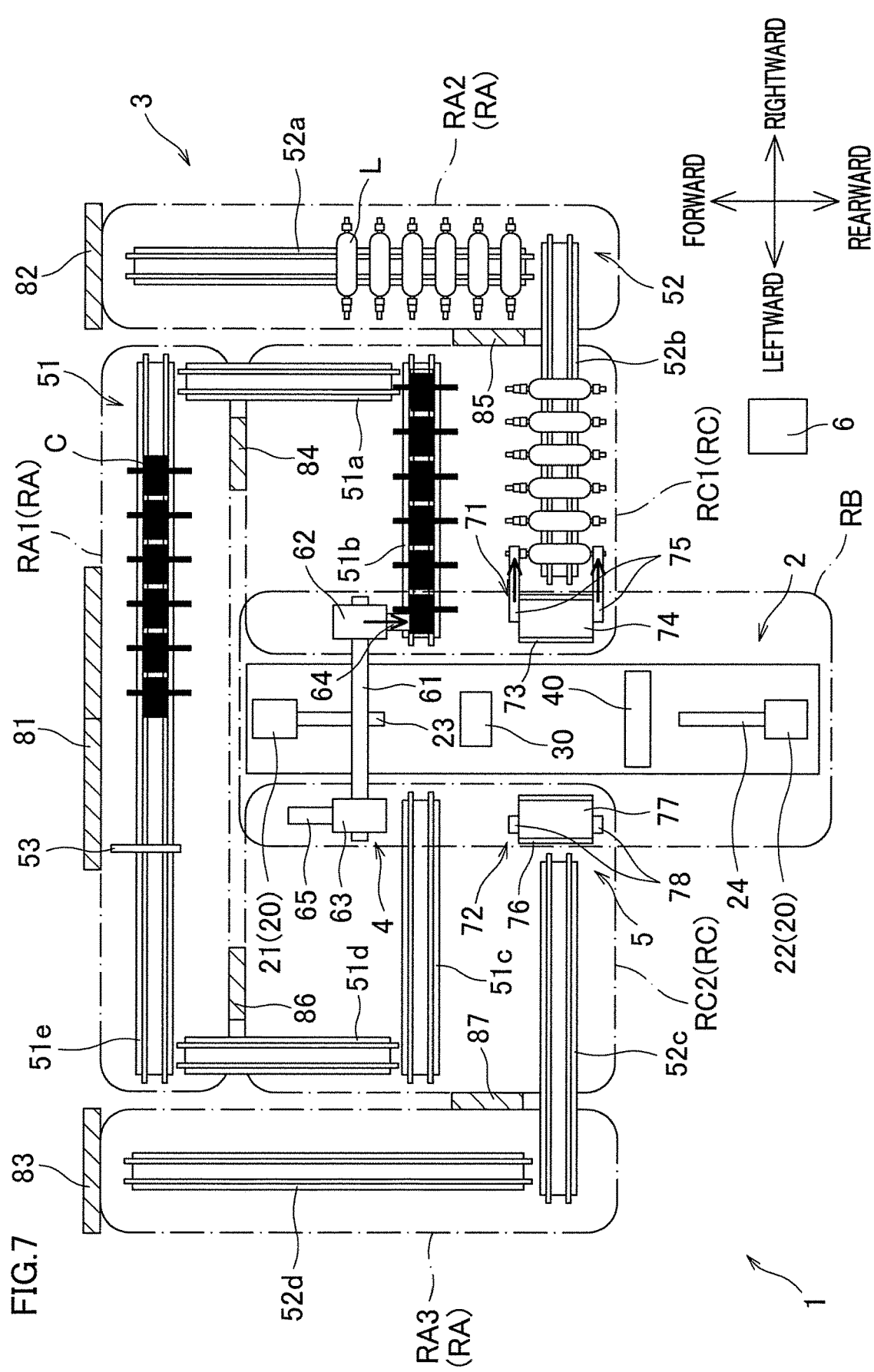
FIG. 7 is a plan view showing a state of the filament winding apparatus.
Figure 8:
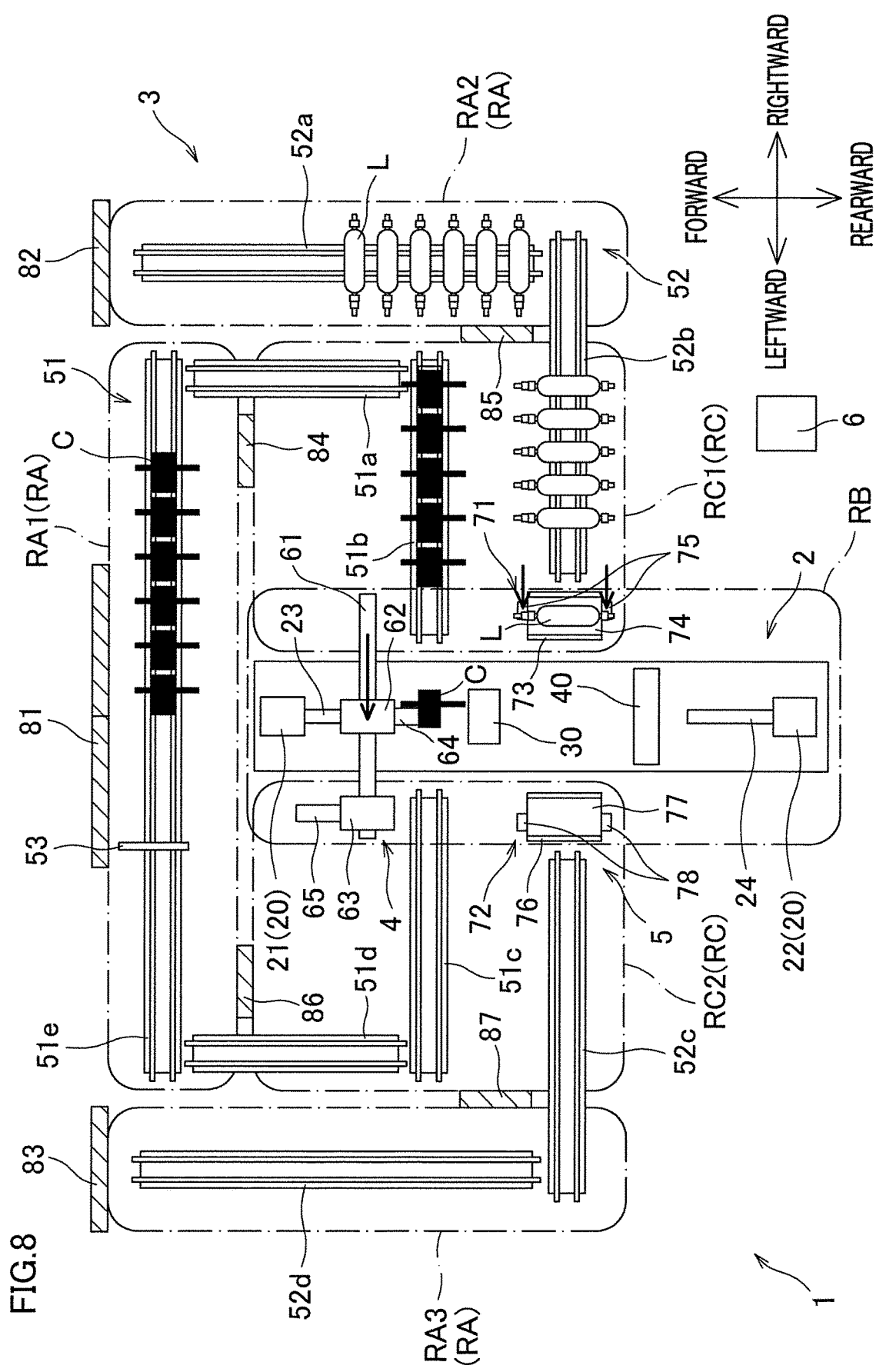
FIG. 8 is a plan view showing a state of the filament winding apparatus.
Figure 9:
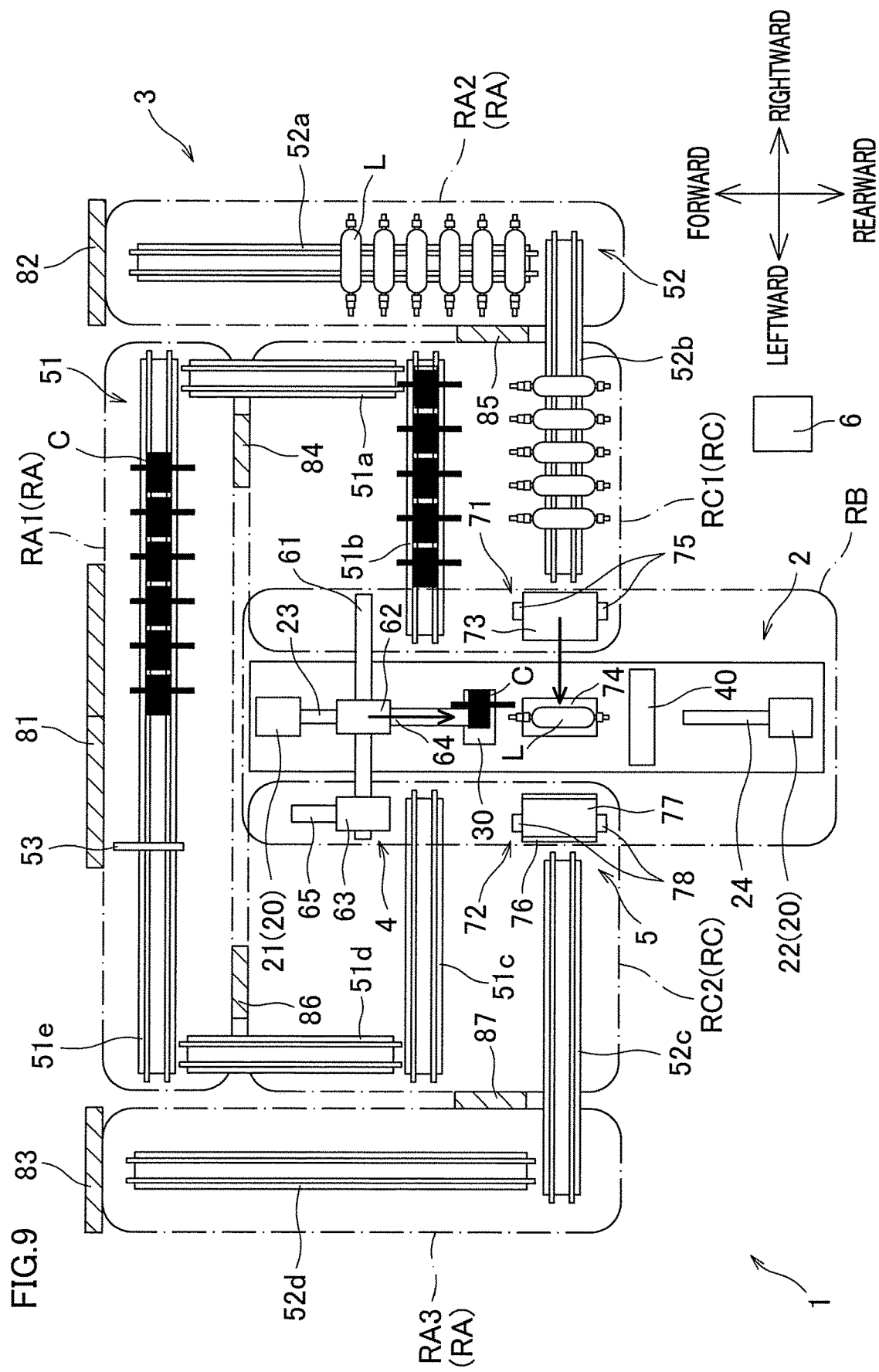
FIG. 9 is a plan view showing a state of the filament winding apparatus.

As shown in FIG. 7, when the carrying-in retaining member 64 is moved rearward while the slider 62 is positioned to face a downstream end portion of the cartridge carrying-in conveyor 51b (i.e., at a carrying-in position), it becomes possible to retain the cartridge C at the downstream end portion of the cartridge carrying-in conveyor 51b by the carrying-in retaining member 64. Subsequently, when the carrying-in retaining member 64 retaining the cartridge C is moved further rearward toward the hoop winding unit 30 as shown in FIG. 9 after the slider 62 is positioned to face the hoop winding unit 30 (i.e., at a detachment/attachment position) as shown in FIG. 8, it becomes possible to attach the cartridge C to the hoop winding unit 30.

The cartridge C attached to the hoop winding unit 30 is hardly visible behind the hoop winding unit 30. Each drawing, however, shows the entire cartridge C for convenience of explanation. In each drawing, furthermore, a cartridge C before it is used for winding (and after the replacement of the bobbins 33 and yarn threading) is depicted in black, whereas a cartridge C after being used is depicted in white. Furthermore, in each drawing, a liner L before fiber bundles are wound thereon is depicted in white whereas a liner L after fiber bundles are wound thereon is depicted in black.

Figure 18:
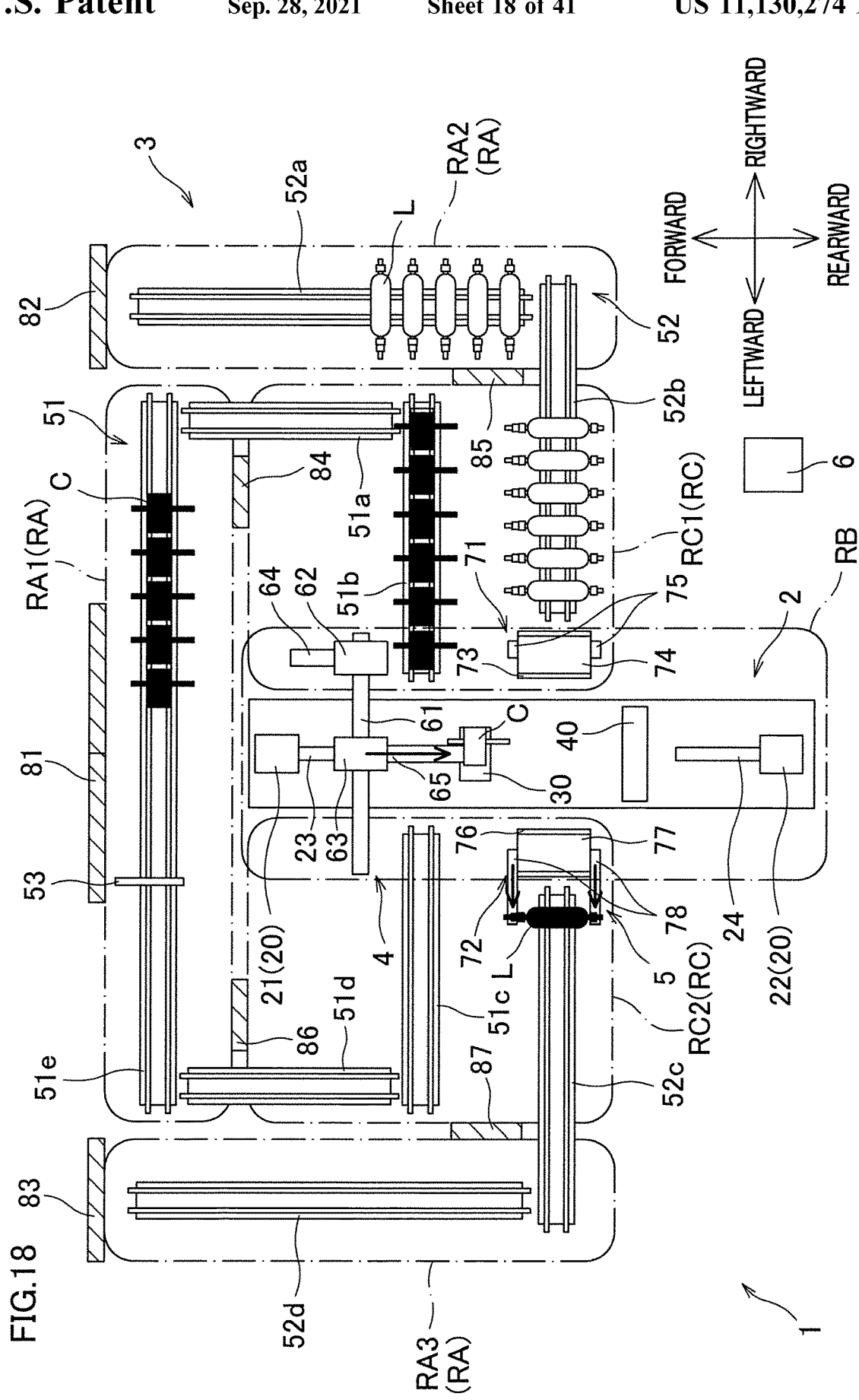
FIG. 18 is a plan view showing a state of the filament winding apparatus.
Figure 19:
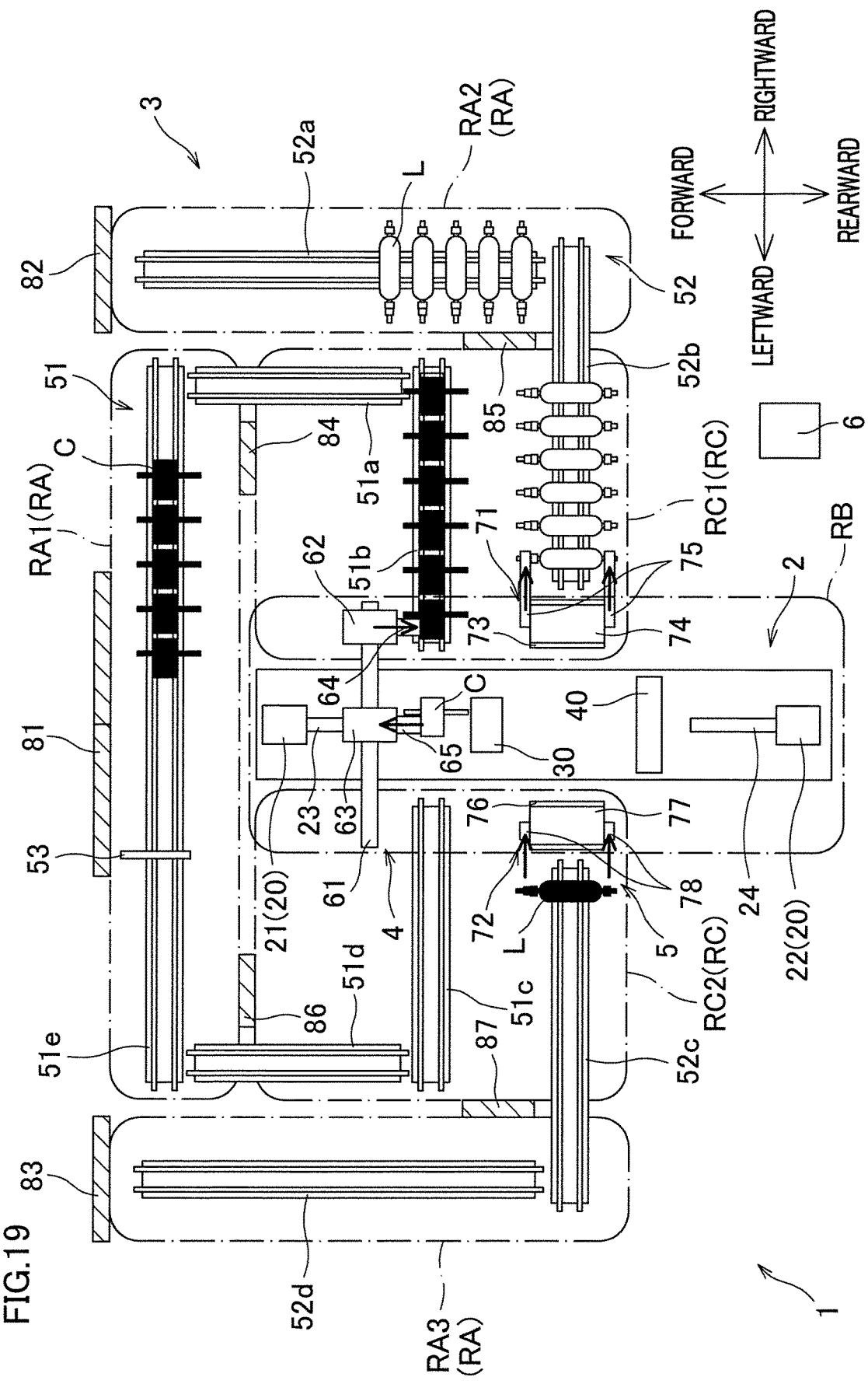
FIG. 19 is a plan view showing a state of the filament winding apparatus.
Figure 20:
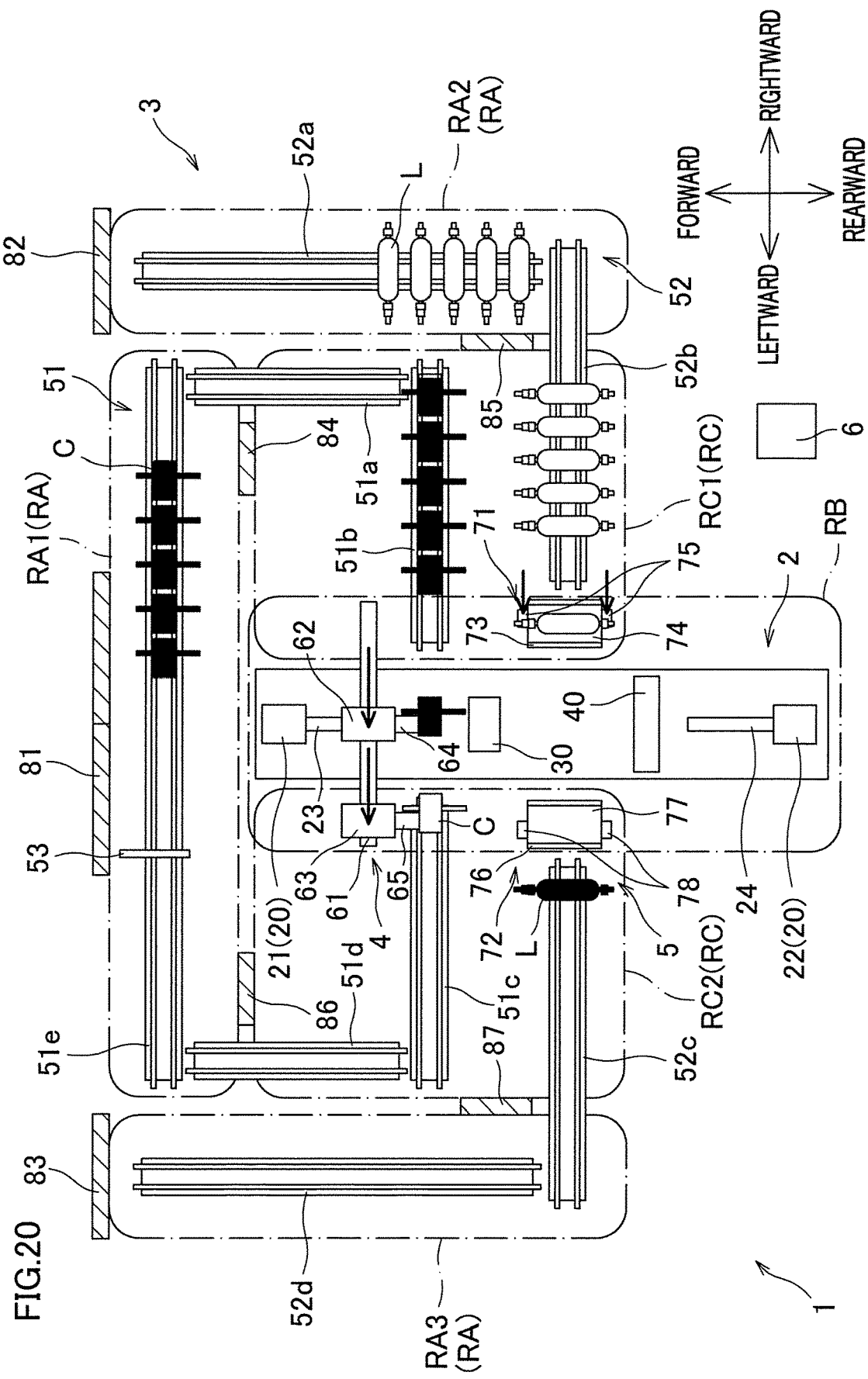
FIG. 20 is a plan view showing a state of the filament winding apparatus.

Meanwhile, when the carrying-out retaining member 65 is moved rearward toward the hoop winding unit 30 while the slider 63 is positioned to face the hoop winding unit 30 (i.e., at a detachment/attachment position) as shown in FIG. 18, it becomes possible to, by the carrying-out retaining member 65, detach and retain the cartridge C attached to the hoop winding unit 30. Subsequently, when the carrying-out retaining member 65 retaining the cartridge C is slightly moved forward as shown in FIG. 19 and then the slider 63 moved to face an upstream end portion of the cartridge carrying-out conveyor 51c (i.e., at a carrying-out position) as shown in FIG. 20, it becomes possible to carry the cartridge C out.

Liner Replacing Device

The liner replacing device 5 is configured to replace the liner L attached to the liner supporting units 20. The liner replacing device 5 includes a carrying-in carrier 71 provided adjacent to the liner carrying-in conveyor 52b and a carrying-out carrier 72 provided adjacent to the liner carrying-out conveyor 52c.

The carrying-in carrier 71 includes a supporting table 73, a placement table 74, and paired arms 75. The supporting table 73 is fixed to a floor surface between the liner carrying-in conveyor 52b and the winder 2. The placement table 74 is attached to upper part of the supporting table 73 via an unillustrated link mechanism or the like. With this arrangement, the placement table 74 is movable between a position directly above the supporting table 73 (hereinafter, a standby position) shown in FIG. 1 and a position on an extension of the supporting shafts 23 and 24 of the liner supporting units 20 (hereinafter, a delivery position) shown in FIG. 9. The paired arms 75 are attached to the front and rear ends of the supporting table 73 to be extendable and contractable in the left-right direction.

As shown in FIG. 7, as the paired arms 75 are extended toward the liner carrying-in conveyor 52b, the liner L at the downstream end portion of the liner carrying-in conveyor 52b can be gripped by the paired arms 75. Thereafter, as shown in FIG. 8, as the paired arms 75 gripping the liner L are contracted, the liner L can be placed on the placement table 74 at the standby position. Thereafter, as shown in FIG. 9, as the placement table 74 on which the liner L is placed is moved to the delivery position, the liner L can be connected to the supporting shafts 23 and 24 of the liner supporting units 20.

The carrying-out carrier 72 includes a supporting table 76, a placement table 77, and paired arms 78. The supporting table 76 is fixed to a floor surface between the liner carrying-out conveyor 52c and the winder 2. The placement table 77 is attached to upper part of the supporting table 76 via an unillustrated link mechanism or the like. With this arrangement, the placement table 77 is movable between a position directly above the supporting table 76 (hereinafter, a standby position) shown in FIG. 1 and a position on an extension of the supporting shafts 23 and 24 of the liner supporting units 20 (hereinafter, a delivery position) shown in FIG. 15. The paired arms 78 are attached to the front and rear ends of the supporting table 76 to be extendable and contractable in the left-right direction.

Figure 15:
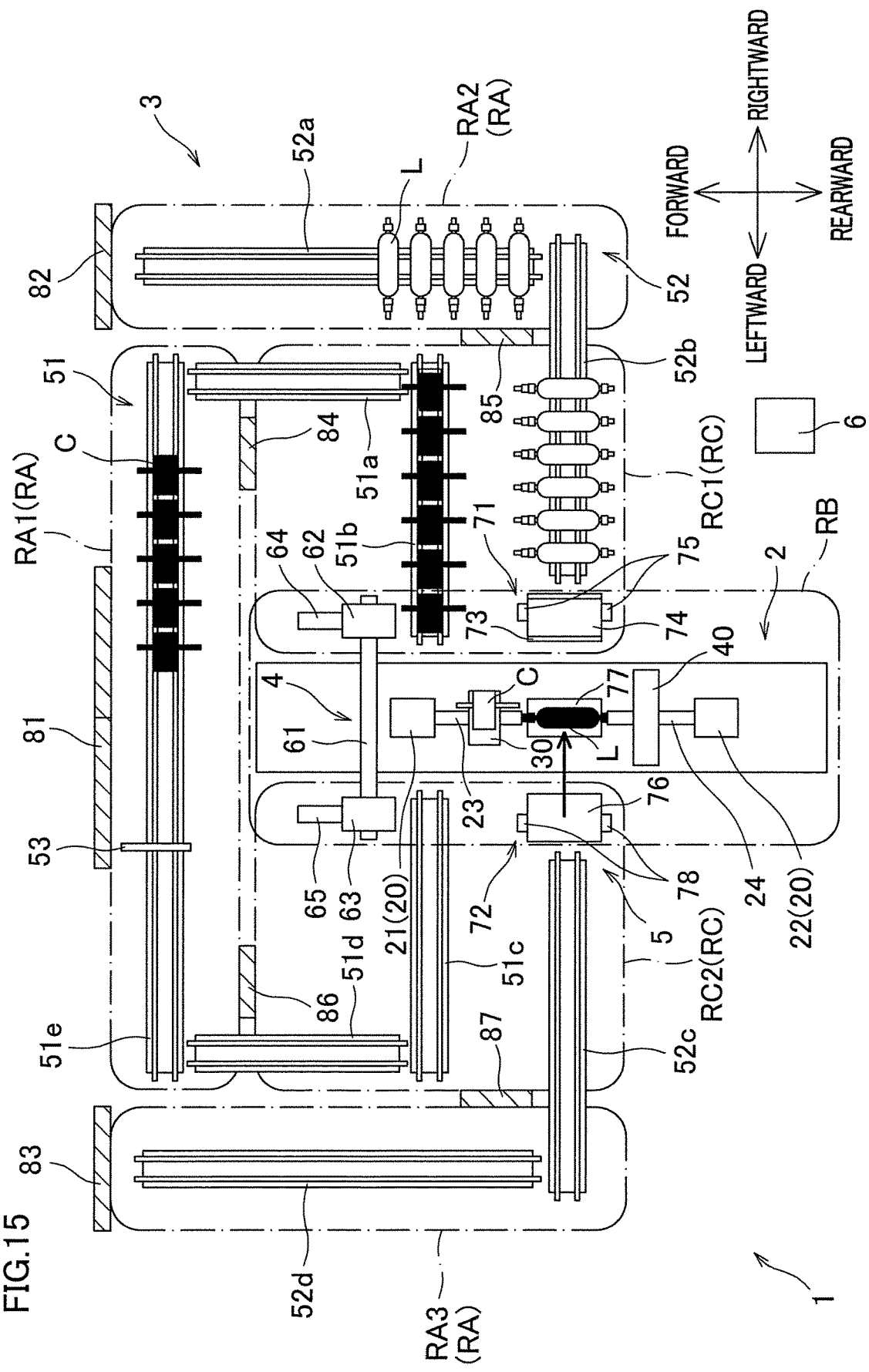
FIG. 15 is a plan view showing a state of the filament winding apparatus.
Figure 16:
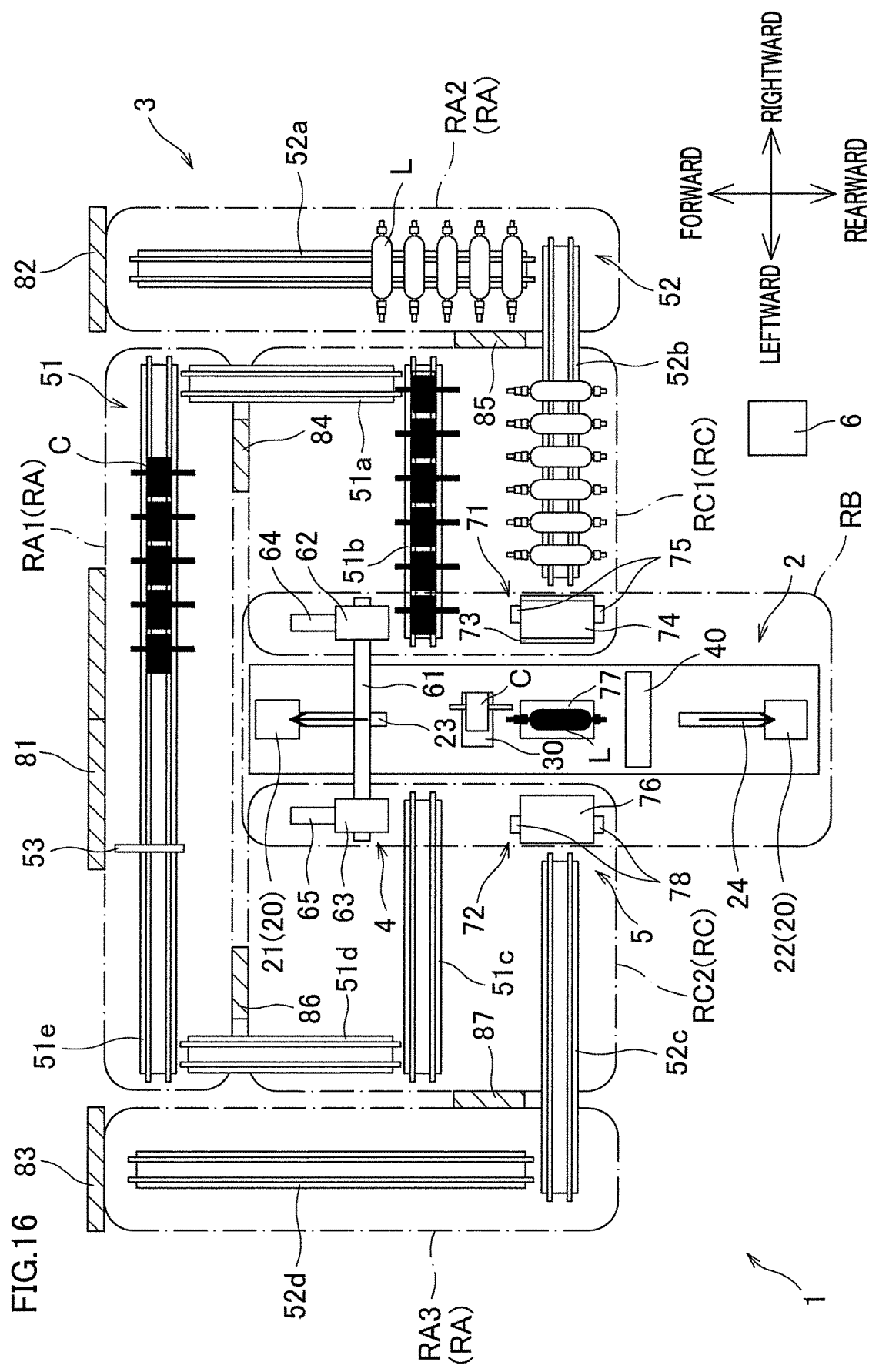
FIG. 16 is a plan view showing a state of the filament winding apparatus.
Figure 17:
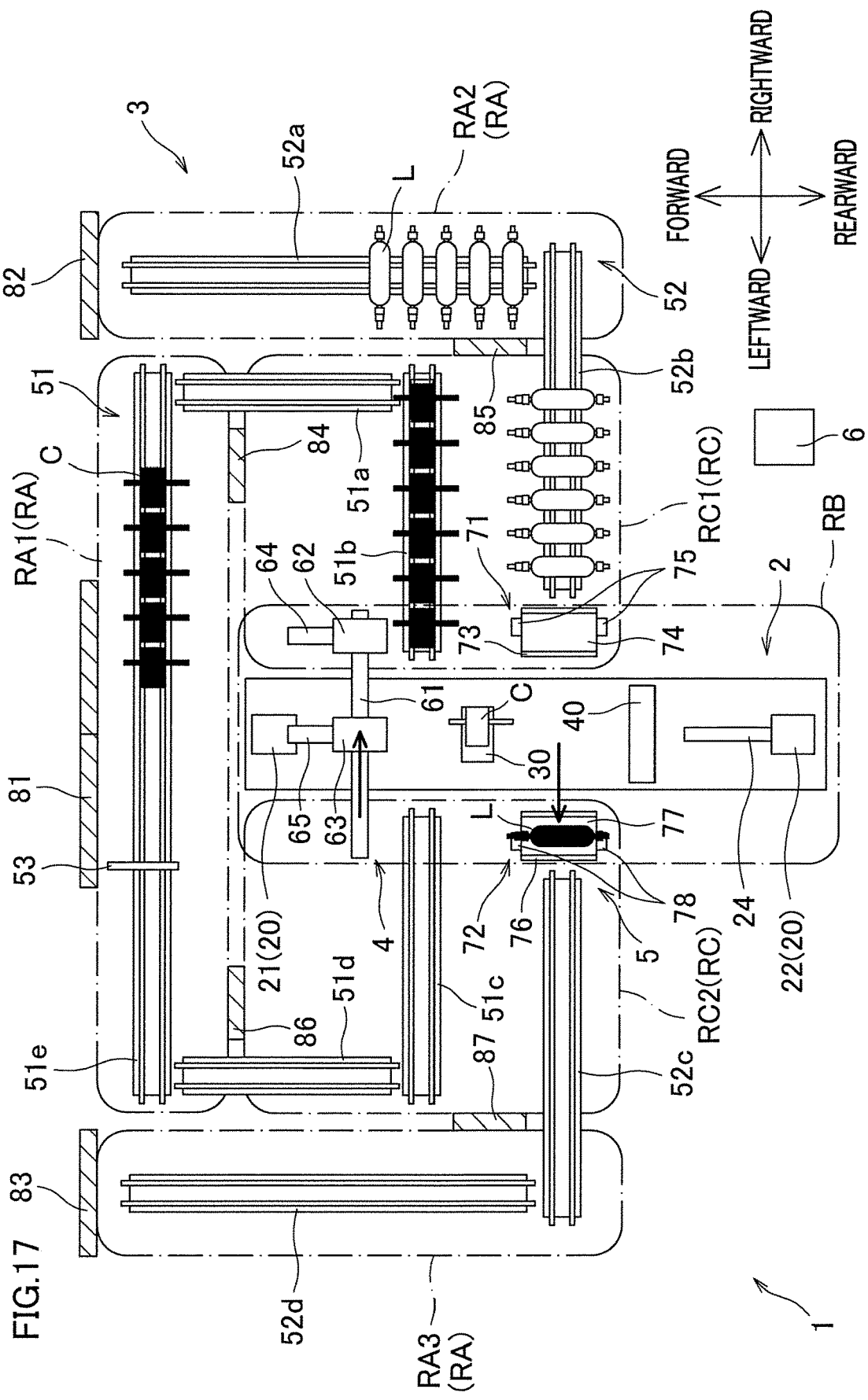
FIG. 17 is a plan view showing a state of the filament winding apparatus.

As shown in FIG. 15, when the placement table 77 is moved to the delivery position, the liner L detached from the supporting shafts 23 and 24 of the liner supporting units 20 can be placed on the placement table 77 as shown in FIG. 16. Subsequently, after the placement table 77 on which the liner L is placed is moved back to the standby position as shown in FIG. 17, the liner L is moved from the placement table 77 to the upstream end portion of the liner carrying-out conveyor 52c by the paired arms 78 as shown in FIG. 18, with the result that the liner L can be carried out from the winder 2.

A series of operations of the carrying-in carrier 71 after the liner L is placed on the placement table 74 will be detailed with reference to FIGS. 40(a)-40(d). Paired supporters 74a are provided at the front and rear end portions of the placement table 74, respectively, to support axial end portions La of the liner L. The carrying-in carrier 71 includes a horizontal driver 71a which is configured to move the placement table 74 in the left-right direction and an elevator 71b configured to move up and down the placement table 74. The carrying-out carrier 72 is structurally similar to the carrying-in carrier 71, and carries the liner L detached from the liner supporting units 20 out by the reverse order of steps as compared to the descriptions below.

The paired arms 75 (not illustrated in FIGS. 40(a)-40(d)) of the carrying-in carrier 71 place the liner L on the placement table 74 at the standby position so that the axial end portions La of the liner L are supported by the paired supporters 74a, as shown in FIG. 40(a). Subsequently, as shown in FIG. 40(b), the carrying-in carrier 71 drives the horizontal driver 71a to move the placement table 74 from the standby position to the delivery position. At this stage, the axial end portions La of the liner L are on the extension of the supporting shafts 23 and 24 of the liner supporting units 20. As the supporting shafts 23 and 24 are connected to the axial end portions La of the liner L, the liner L is rotatably supported by the liner supporting units 20. For a specific arrangement to detach and attach the supporting shafts 23 and 24 from and to the axial end portions La of the liner L, see Japanese Laid-Open Patent Publication No. 2014-177011, for example.

When the liner L is supported by the liner supporting units 20, as shown in FIG. 40(c), the carrying-in carrier 71 drives the elevator 71b to move the placement table 74 slightly downward from the delivery position. This prevents the placement table 74 (in particular the supporter 74a) from interfering with the liner L when the placement table 74 is moved back to the standby position. Subsequently, as shown in FIG. 40(d), after driving the horizontal driver 71a to return the placement table 74 to the location directly below the standby position, the carrying-in carrier 71 drives the elevator 71b to move the placement table 74 upward. As a result, the placement table 74 returns to the standby position.

Working Area, Operation Area, and Buffer Area

The filament winding apparatus 1 arranged as described above has a working area RA, an operation area RB, and a buffer area RC. By providing the working area RA, the operation area RB, and the buffer area RC in the filament winding apparatus 1, the disclosure tries to achieve both safety of the operator and improvement in efficiency of winding. Hereinafter, an area which is neither the working area RA, the operation area RB, nor the buffer area RC is termed an outside area.

As shown in FIG. 1, first safety fences 7 indicated by thick lines are provided at the borders between (i) the operation area RB and the buffer area RC and (ii) the working area RA and the borders between (I) the operation area RB and the buffer area RC and (II) the outside area. Said differently, the first safety fences 7 are provided to surround the operation area RB and the buffer area RC. At the borders between the working area RA and the outside area, second safety fences 8 indicated by thick lines are provided. Said differently, the second safety fence 8 are provided to surround the working area RA. At a part where the first safety fence 7 overlaps the second safety fence 8, one safety fence may function as both the first safety fence 7 and the second safety fence 8. In FIGS. 3 to 39, the first safety fences 7 and the second safety fences 8 are not shown.

The working area RA is an area where an operator is able to perform various operations. The working area RA includes a first working area RA1 where operations for the cartridge C on the cartridge conveyance path 51 can be performed and a second working area RA2 and a third working area RA3 where operations for the liner L on the liner conveyance path 52 can be performed.

The connection conveyor 51e is provided in the first working area RA1. In the first working area RA1, the operator is able to perform operations such as replacement of the bobbins 33 on the used cartridge C conveyed to the connection conveyor 51e and yarn placement of placing fiber bundles onto an unillustrated yarn placement roller of the cartridge C. In the second safety fence 8 at the border between the first working area RA1 and the outside area, a door 81 is provided. The operator is able to enter the first working area RA1 through the door 81.

The liner carrying-in conveyor 52a is provided in the second working area RA2. In the second working area RA2, the operator is able to perform operations such as carrying the liner L onto the liner carrying-in conveyor 52a. In the second safety fence 8 at the border between the second working area RA2 and the outside area, a door 82 is provided. The operator is able to enter the second working area RA2 through the door 82.

The liner carrying-out conveyor 52d is provided in the third working area RA3. In the third working area RA3, the operator is able to perform operations such as carrying the liner L out from the liner carrying-out conveyor 52d. In the second safety fence 8 at the border between the third working area RA3 and the outside area, a door 83 is provided. The operator is able to enter the third working area RA3 through the door 83.

The operation area RB is an area where the winder 2, the cartridge replacing device 4, and the liner replacing device 5 are driven. In the operation area RB, the winder 2, the cartridge replacing device 4, and the liner replacing device 5 may be driven at high speed. Furthermore, in the later-described buffer area RC, the cartridge C and the liner L which are heavy are conveyed. Therefore, the operation area RB and the buffer area RC are surrounded by the first safety fences 7 as described above to protect the safety of the operator. Basically, the operator cannot enter the space inside the first safety fences 7 unless the winder 2, the conveyance device 3, the cartridge replacing device 4, and the liner replacing device 5 are stopped.

The buffer area RC is an area between the working area RA and the operation area RB in the conveyance direction in which the cartridges C and the liners L are conveyed. The cartridges C and the liners L can be accumulated in this area. The buffer area RC includes a carrying-in buffer area RC1 and a carrying-out buffer area RC2.

The carrying-in buffer area RC1 is positioned between the first working area RA1 and the operation area RB and between the second working area RA2 and the operation area RB in the conveyance direction. The carrying-in buffer area RC1 includes a downstream part of the cartridge carrying-in conveyer 51a, the cartridge carrying-in conveyer 51b, and a downstream part of the liner carrying-in conveyor 52b.

A door 84 is provided in the first safety fence 7 at the border between the carrying-in buffer area RC1 and the first working area RA1. The door 84 is sized to allow the cartridge C to pass therethrough when it is in the open state.

The operator is able to enter the carrying-in buffer area RC1 from the first working area RA1 through the door 84. The door 84 has another function of blocking the cartridge carrying-in conveyer 51a. When the door 84 is closed, the conveyance of the cartridge C by the cartridge carrying-in conveyer 51b is blocked. The cartridge C can be accumulated in the part of the cartridge conveyance path 51 included in the carrying-in buffer area RC1, i.e., a part of the cartridge carrying-in conveyer 51a, which is downstream of the door 84, and the cartridge carrying-in conveyer 51b.

A door 85 is provided in the first safety fence 7 at the border between the carrying-in buffer area RC1 and the second working area RA2. The door 85 is sized to allow the liner L to pass therethrough when it is in the open state. The operator is able to enter the carrying-in buffer area RC1 from the second working area RA2 through the door 85. The door 85 has another function of blocking the liner carrying-in conveyor 52b. When the door 85 is closed, the conveyance of the liner L by the liner carrying-in conveyor 52b is blocked. The liner L can be accumulated in the part of the liner conveyance path 52 included in the carrying-in buffer area RC1, i.e., a part of the liner carrying-in conveyor 52b, which is downstream of the door 85.

The carrying-out buffer area RC2 is provided between the operation area RB and the first working area RA1 and between the operation area RB and the third working area RA3 in the conveyance direction. The carrying-out buffer area RC2 includes a cartridge carrying-out conveyer 51c, an upstream part of the cartridge carrying-out conveyer 51d, and an upstream part of the liner carrying-out conveyor 52c.

A door 86 is provided in the first safety fence 7 at the border between the carrying-out buffer area RC2 and the first working area RA1. The door 86 is sized to allow the cartridge C to pass therethrough when it is in the open state. The operator is able to enter the carrying-out buffer area RC2 from the first working area RA1 through the door 86. The door 86 has another function of blocking the cartridge carrying-out conveyer 51d. When the door 86 is closed, the conveyance of the cartridge C by the cartridge carrying-out conveyer 51d is blocked. A used cartridge C can be accumulated in the part of the cartridge conveyance path 51 included in the carrying-out buffer area RC2, i.e., the cartridge carrying-out conveyer 51c and a part of the cartridge carrying-out conveyer 51d, which is upstream of the door 86.

A door 87 is provided in the first safety fence 7 at the border between the carrying-out buffer area RC2 and the third working area RA3. The door 87 is sized to allow the liner L to pass therethrough when it is in the open state. The operator is able to enter the carrying-out buffer area RC2 from the third working area RA3 through the door 87. The door 87 has another function of blocking the liner carrying-out conveyer 52c. When the door 87 is closed, the conveyance of the liner L by the liner carrying-out conveyer 52c is blocked. The liner L can be accumulated in a part of the liner conveyance path 52 included in the carrying-out buffer area RC2, i.e., a part of the liner carrying-out conveyer 52c, which is upstream of the door 87.

Control of Door

An operation unit 9 by which the operator locks and unlocks the doors 81 to 83 is provided in the outside area. The operation unit 9 is formed of a touch panel, for example, and connected to the controller 6. When the winder 2 is driven, the doors 81 to 83 are locked whereas the doors 84 to 87 are open. This allows the cartridge C to be conveyed on the cartridge conveyance path 51 and the liner L to be conveyed on the liner conveyance path 52, and allows the winder 2 to automatically and continuously perform winding.

When the operator enters the working area RA1 (or RA2 or RA3) while the winder 2 is driven, the operator instructs unlocking of the door 81 (or 82 or 83) through the operation unit 9. In response to this, the controller 6 unlocks the door 81 (or 82 or 83) and locks the doors 84 to 87. With this arrangement, neither cartridge C nor liner L is conveyed to the working area RA when the operator is in the working area RA, and the entrance of the operator into the buffer area RC through the doors 84 to 87 is prohibited. The winder 2 is able to continue the winding by using the cartridge C or the liner L accumulated in the buffer area RC1.

The locked state of the doors 84 to 87 is maintained until the operator goes out from the working area RA to the outside area and instructs locking of the unlocked door 81 (or 82 or 83) by using the operation unit 9. In response to the locking instructed by the operator, the controller 6 locks the door 81 (or 82 or 83) and changes the doors 84 to 87 to be in the open state. As a result of this, the conveyance of the cartridge C or the liner L is resumed. After the winder 2 is stopped, all of the doors 81 to 87 are unlocked by the controller 6, and the operator is allowed to perform maintenance and the like in each of the areas RA to RC.

Flow of Winding

The filament winding apparatus 1 arranged as described above is able to continuously perform winding of the fiber bundles onto the liner L. The following will describe a flow of the winding with reference to FIGS. 3 to 24. In this example, the amount of the fiber bundles wound on the bobbins 33 is more or less slightly larger than the amount used in one hoop winding, and hence the cartridge C is replaced after the hoop winding is completed once. In each drawing, the movement of each member is indicated by an arrow.

Figure 3:
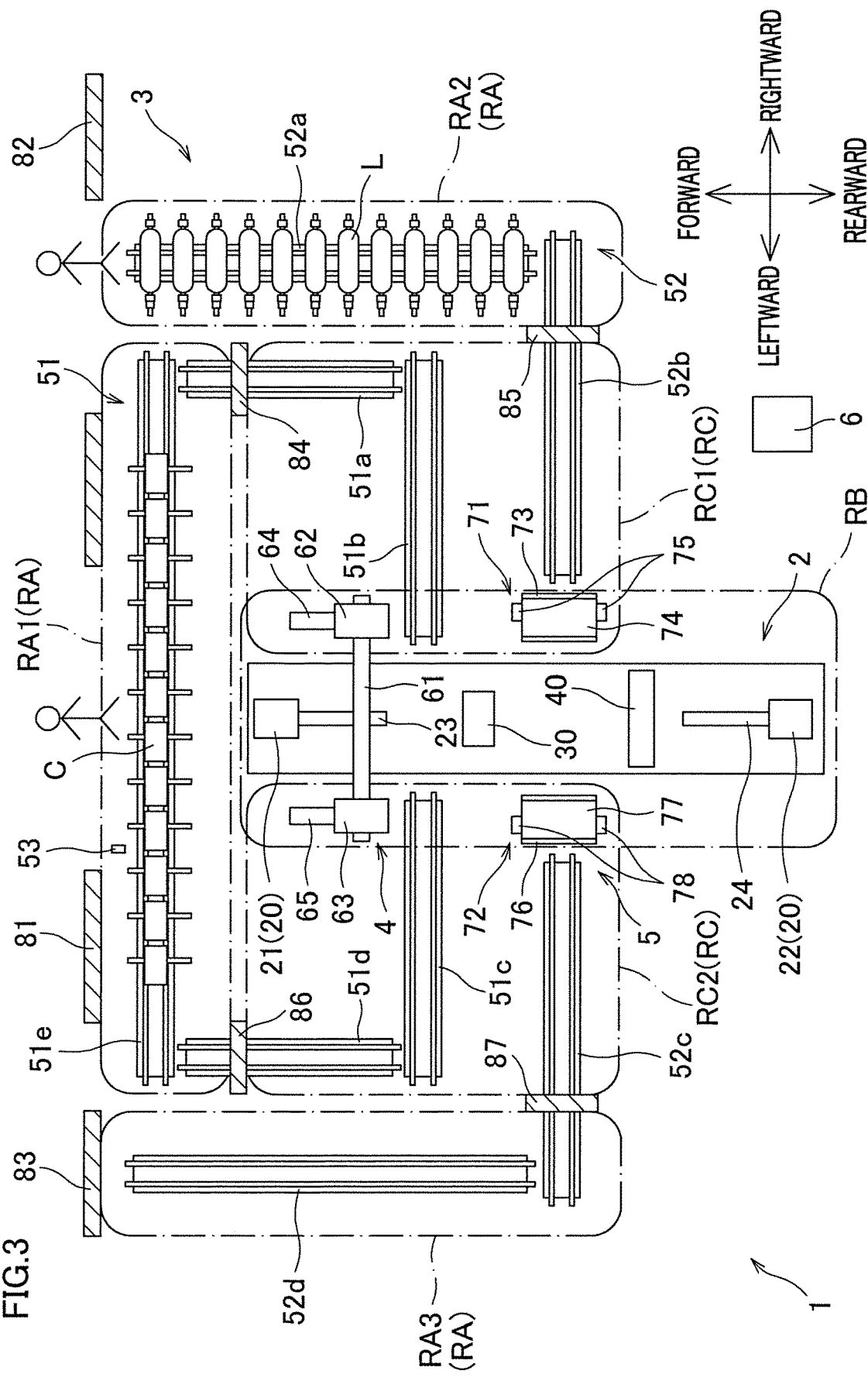
FIG. 3 is a plan view showing a state of the filament winding apparatus.

At the start of the winding as shown in FIG. 3, the operator opens the door 81 and enters the first working area RA1, and supplies cartridges C to the connection conveyor 51e. At this stage, no cartridge C is conveyed to the winder 2 because the door 84 is closed. At this stage, furthermore, new bobbins 33 are attached to the supplied cartridges C, but yarn threading has not been done. Alternatively, the cartridges C on which yarns have been threaded may be supplied, or the cartridges C to which empty bobbins 33 are attached may be supplied. Furthermore, the operator opens the door 82 and enters the second working area RA2 to convey the liners L to the liner carrying-in conveyor 52a. At this stage, no liner L is conveyed to the winder 2 because the door 85 is closed.

Figure 4:
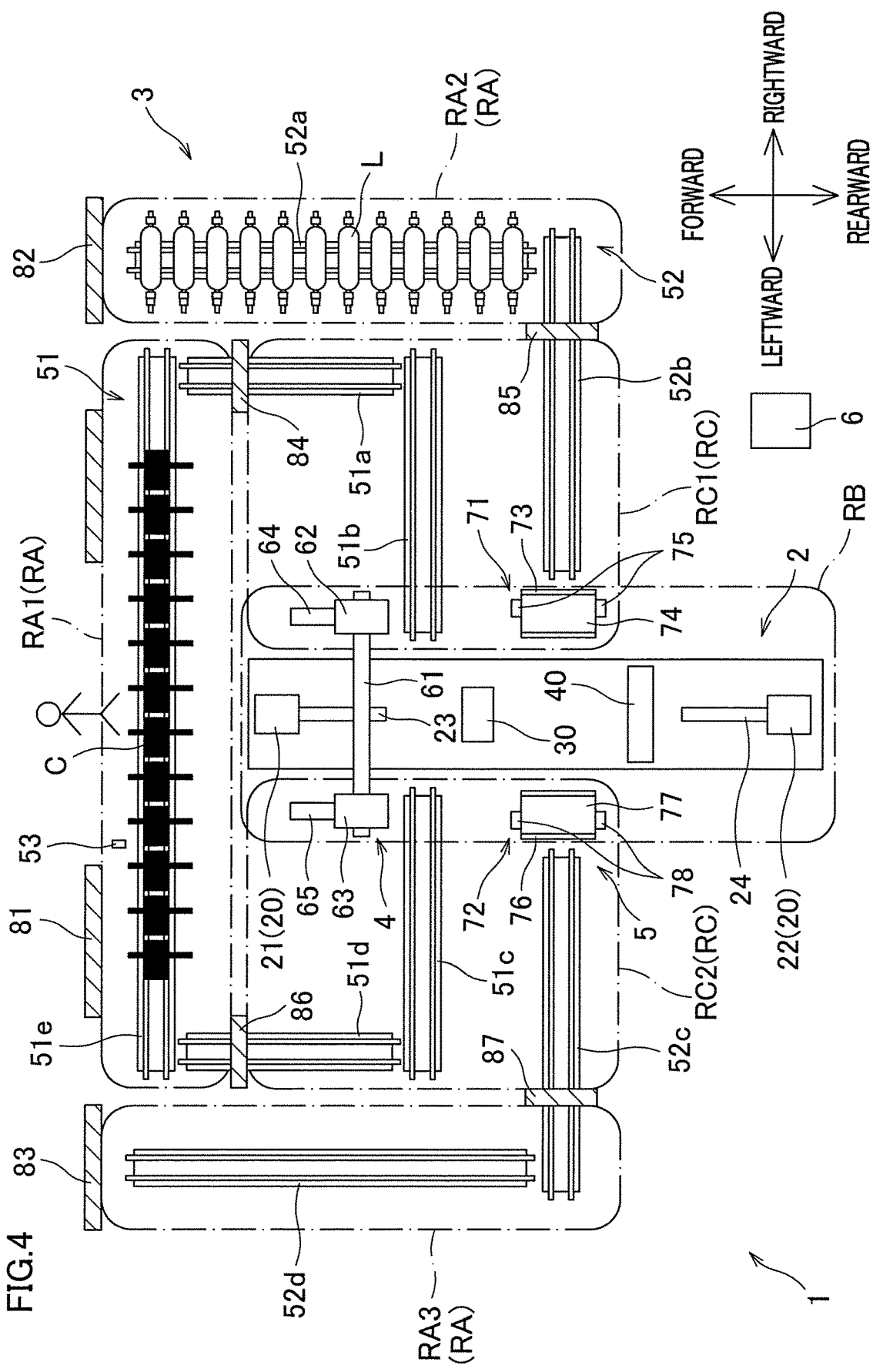
FIG. 4 is a plan view showing a state of the filament winding apparatus.
Figure 5:
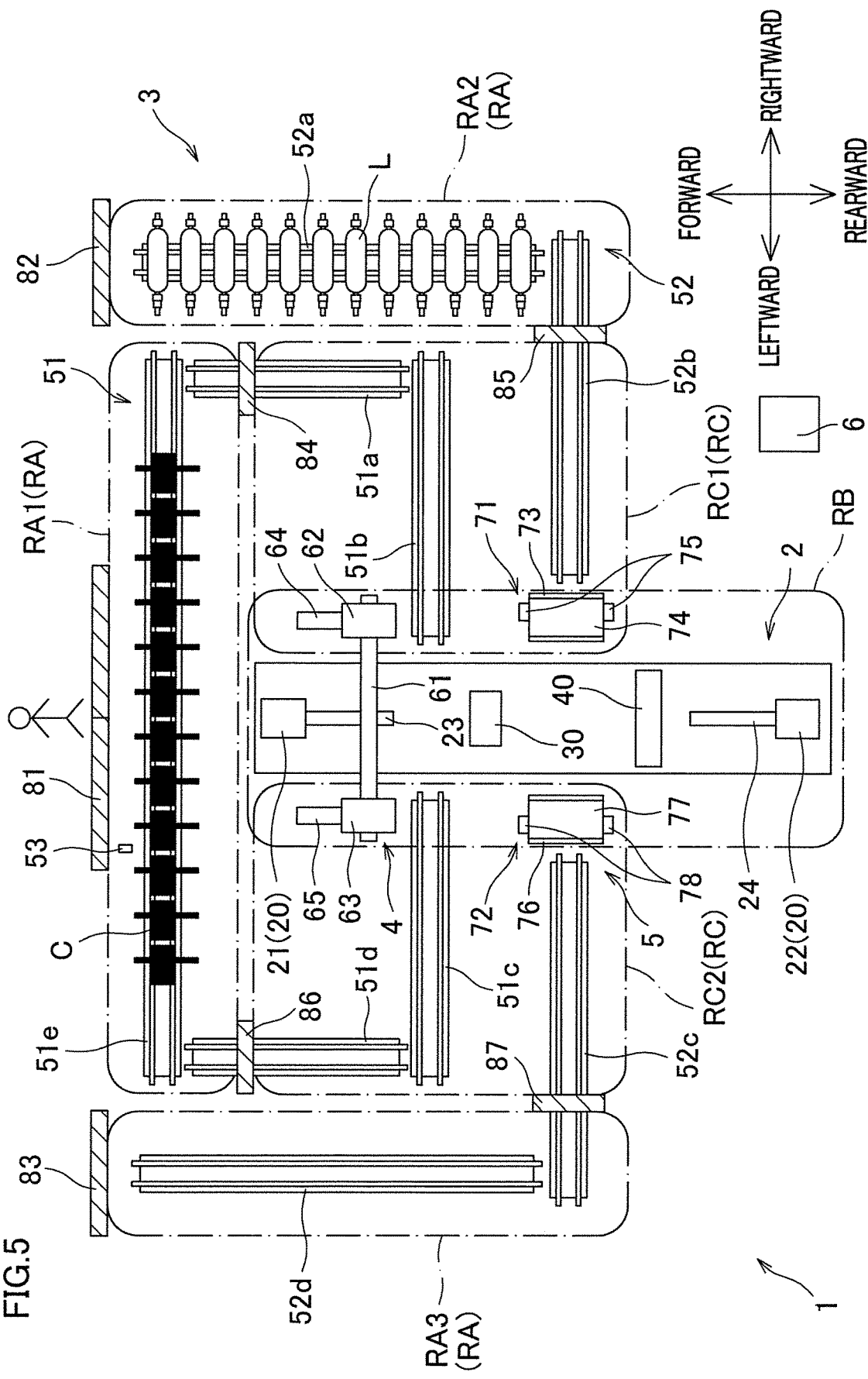
FIG. 5 is a plan view showing a state of the filament winding apparatus.

Subsequently, as shown in FIG. 4, the operator performs yarn threading to the cartridges C in the first working area RA1. When the cartridges C to which yarn threading has been done are supplied, the yarn threading is unnecessary. When the cartridges C to which empty bobbins 33 are attached are supplied, replacement of the bobbins 33 and yarn threading are necessary. After these preparations, the operator goes out from the first working area RA1 and closes and locks the door 81 as shown in FIG. 5.

Figure 6:
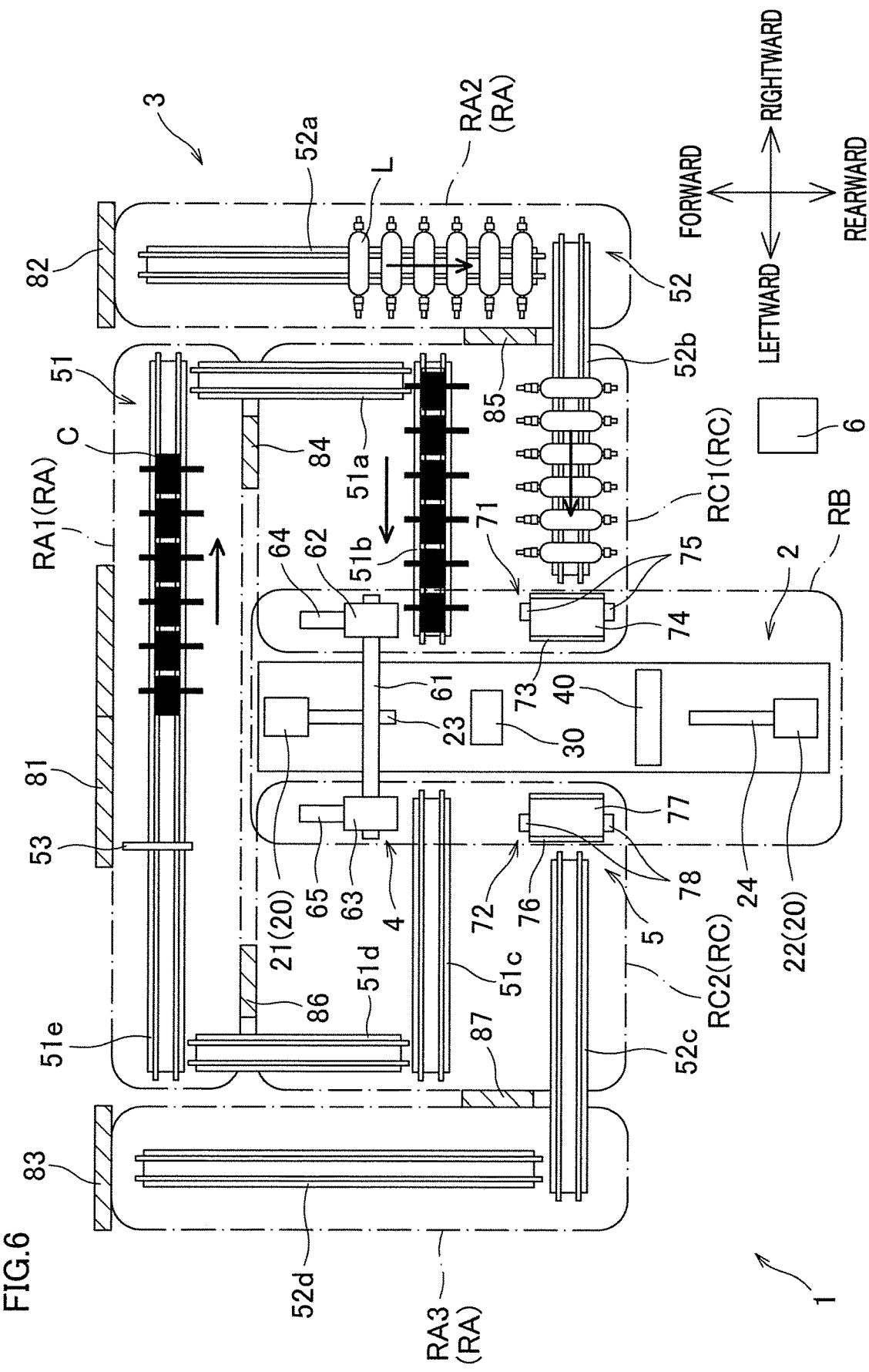
FIG. 6 is a plan view showing a state of the filament winding apparatus.

When the door 81 is locked, the doors 84 to 87 are opened and the conveyance of the cartridges C and the liners L starts as shown in FIG. 6. As a result, the cartridges C are accumulated in order on the downstream side of the cartridge carrying-in conveyer 51b. The liners L are accumulated in order on the downstream side of the liner carrying-in conveyor 52b. When observing that all cartridges C are conveyed to the downstream of the stopper 53, the operator changes the stopper 53 to the blocked state. This change of the stopper 53 may be automatically done by using a sensor or the like which is configured to detect the cartridges C.

Subsequently, attachment of the cartridge C to the hoop winding unit 30 and attachment of the liner L to the liner supporting units 20 are simultaneously done. Alternatively, attachment of the cartridge C to the hoop winding unit 30 and attachment of the liner L to the liner supporting units 20 may be done in order.

Figure 10:
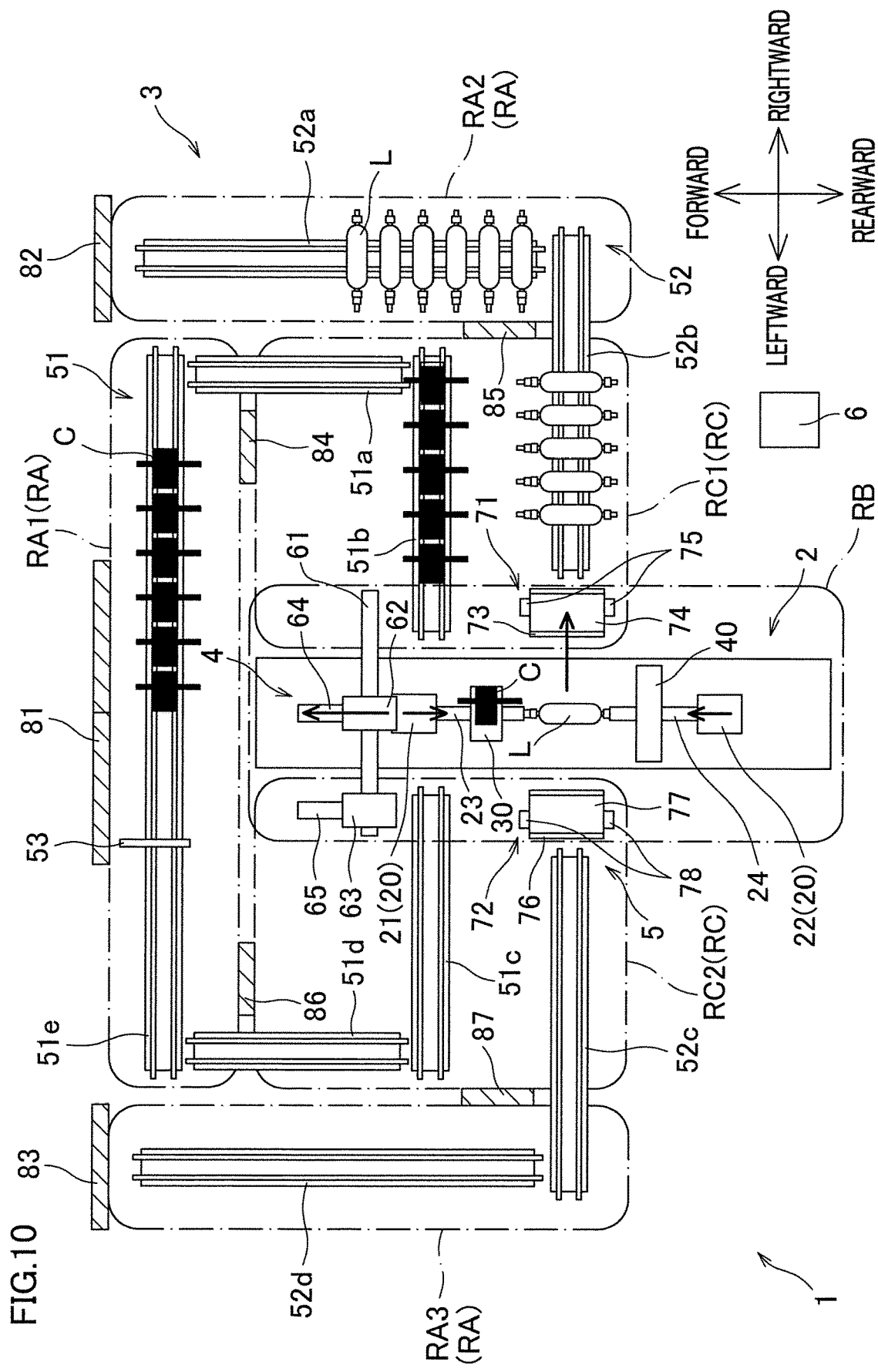
FIG. 10 is a plan view showing a state of the filament winding apparatus.

To begin with, the attachment of the cartridge C will be explained. As shown in FIG. 7, the cartridge replacing device 4 moves the carrying-in retaining member 64 rearward while the slider 62 is at the carrying-in position. As a result, the cartridge C on the cartridge carrying-in conveyor 51b is retained by the carrying-in retaining member 64. Subsequently, after the slider 62 is moved to the detachment/attachment position as shown in FIG. 8, the carrying-in retaining member 64 is moved further rearward as shown in FIG. 9. As a result, it becomes possible to attach the cartridge C to the hoop winding unit 30. Upon completion of the attachment of the cartridge C, the carrying-in retaining member 64 is moved back forward as shown in FIG. 10 and then the slider 62 is returned to the carrying-in position as shown in FIG. 11.

Now, the attachment of the liner L will be explained. As shown in FIG. 7, the carrying-in carrier 71 of the liner replacing device 5 extends the paired arms 75 toward the liner carrying-in conveyor 52b to grip the liner L on the liner carrying-in conveyor 52b. Thereafter, as shown in FIG. 8, the paired arms 75 gripping the liner L are contracted, and the liner L is placed on the placement table 74 at the standby position. Subsequently, after the placement table 74 on which the liner L is placed is moved to the delivery position as shown in FIG. 9, the first liner supporting unit 21 and the second liner supporting unit 22 are moved toward the liner L as shown in FIG. 10, with the result that the liner L is connected to the supporting shafts 23 and 24 and the liner L attached to the liner supporting units 20. Upon completion of the attachment of the liner L, the placement table 74 is moved back to the standby position.

Figure 11:
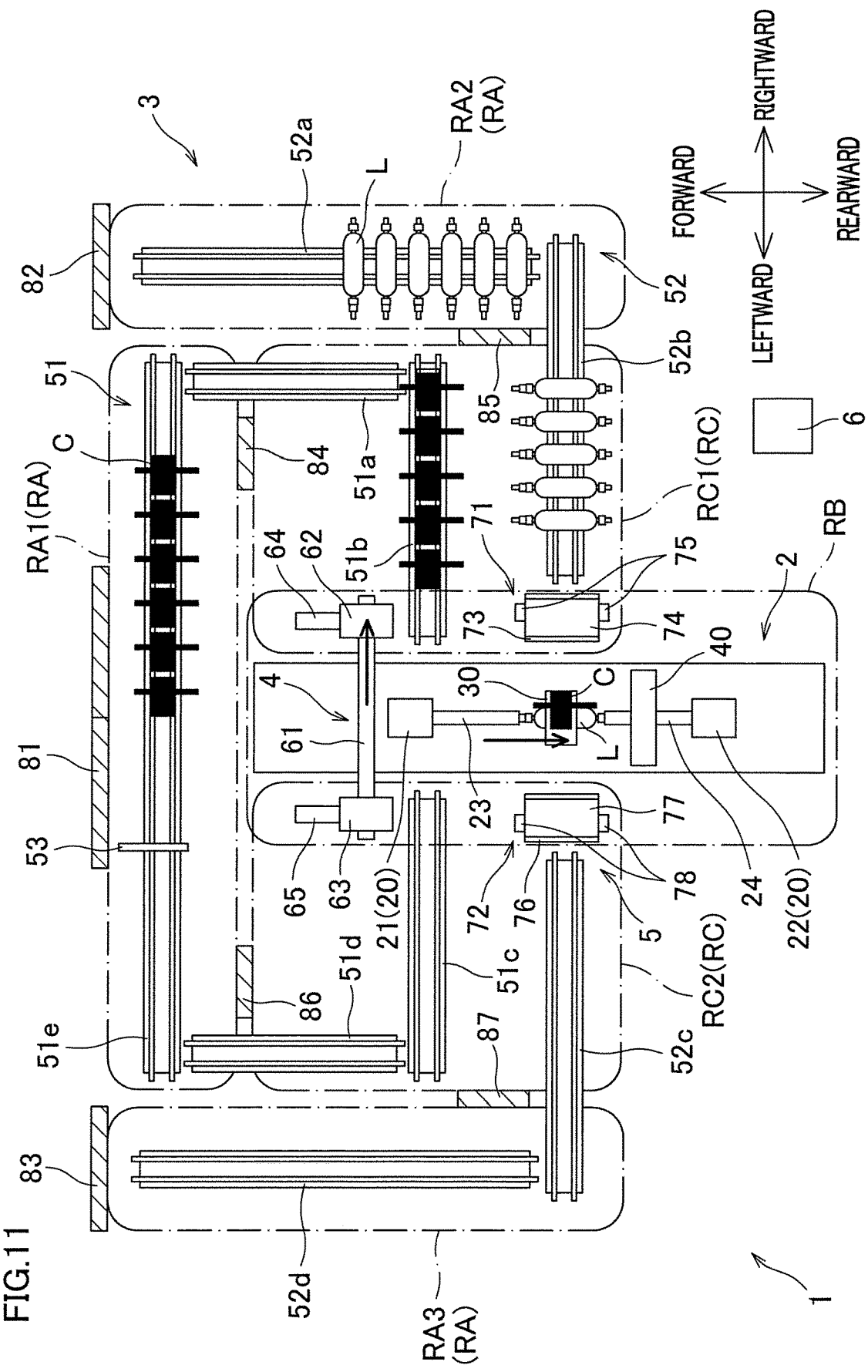
FIG. 11 is a plan view showing a state of the filament winding apparatus.
Figure 12:
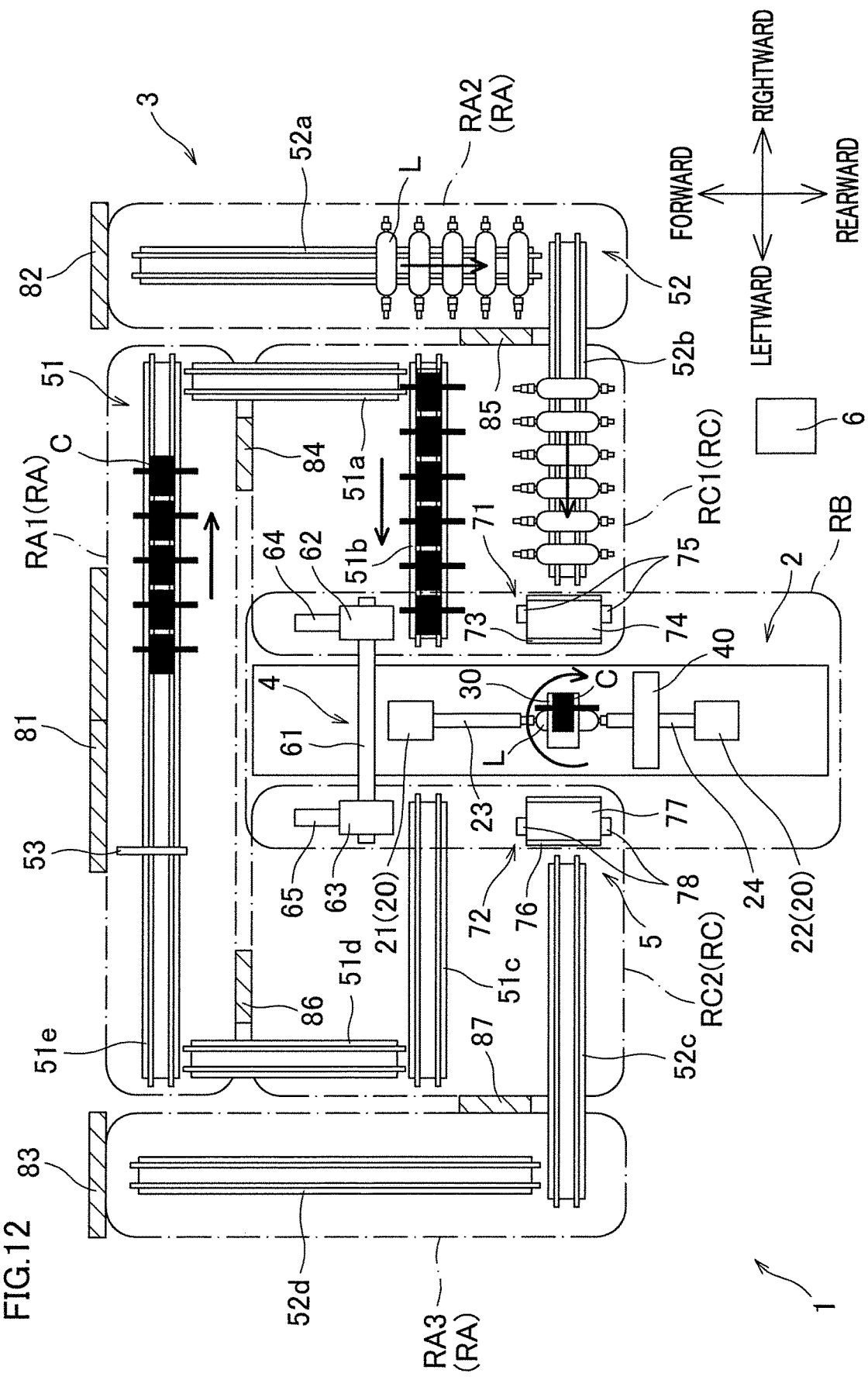
FIG. 12 is a plan view showing a state of the filament winding apparatus.

After attachment of the cartridge C to the hoop winding unit 30 and attachment of the liner L to the liner supporting units 20, the hoop winding unit 30 is moved to the location where the liner L is provided as shown in FIG. 11, and then hoop-winding by the hoop winding unit 30 starts as shown in FIG. 12. While the hoop-winding is being performed, the cartridges C and the liners L on the carrying-in side are conveyed to the downstream side. Helical-winding by the helical winding unit 40 is not explained here.

Figure 13:
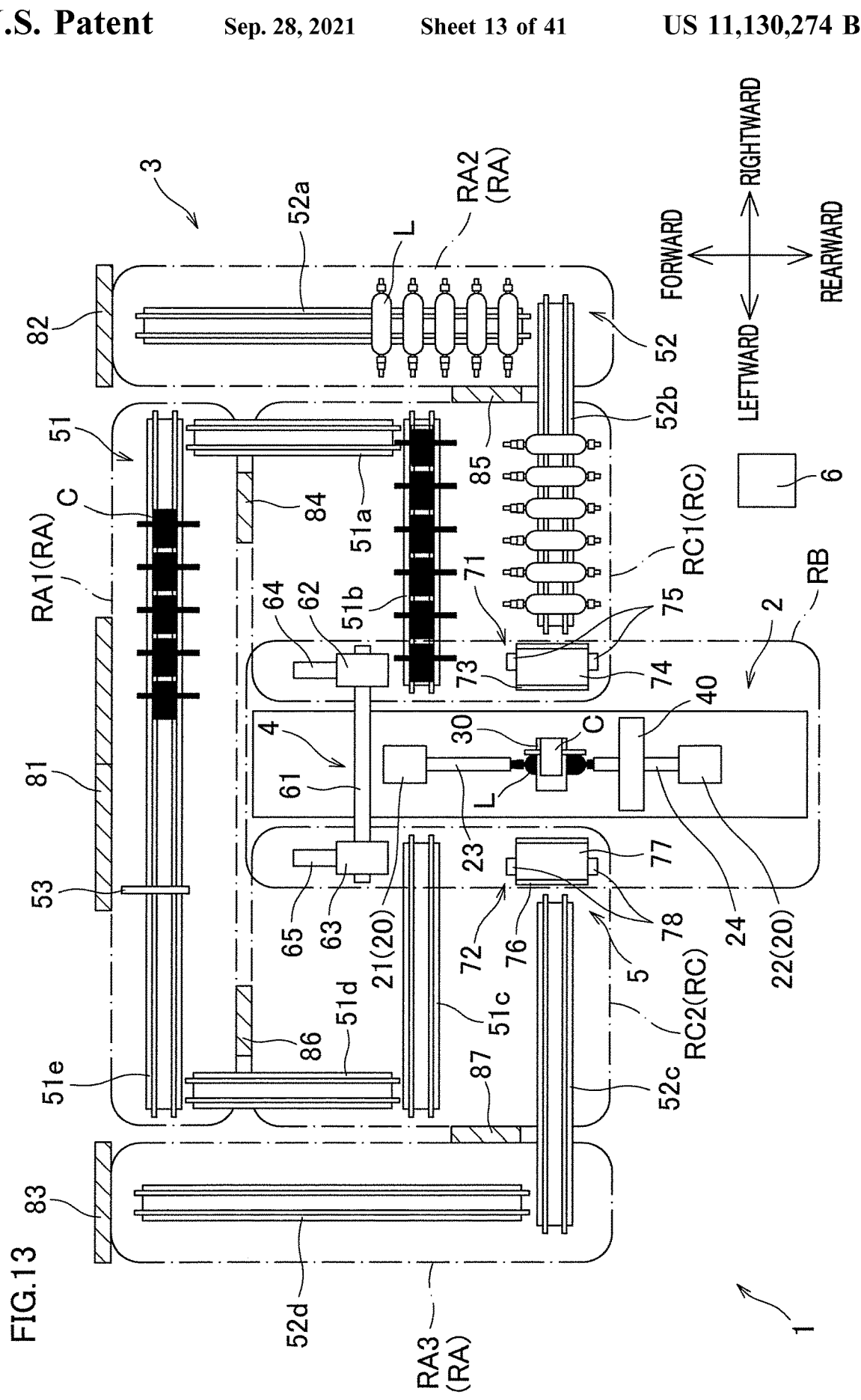
FIG. 13 is a plan view showing a state of the filament winding apparatus.

FIG. 13 shows a state in which the hoop-winding by the hoop winding unit 30 has been completed. When the hoop-winding is completed, replacement of the cartridge C attached to the hoop winding unit 30 and replacement of the liner L attached to the liner supporting units 20 are simultaneously done. Alternatively, replacement of the cartridge C attached to the hoop winding unit 30 and replacement of the liner L attached to the liner supporting units 20 may be done in order.

Figure 14:
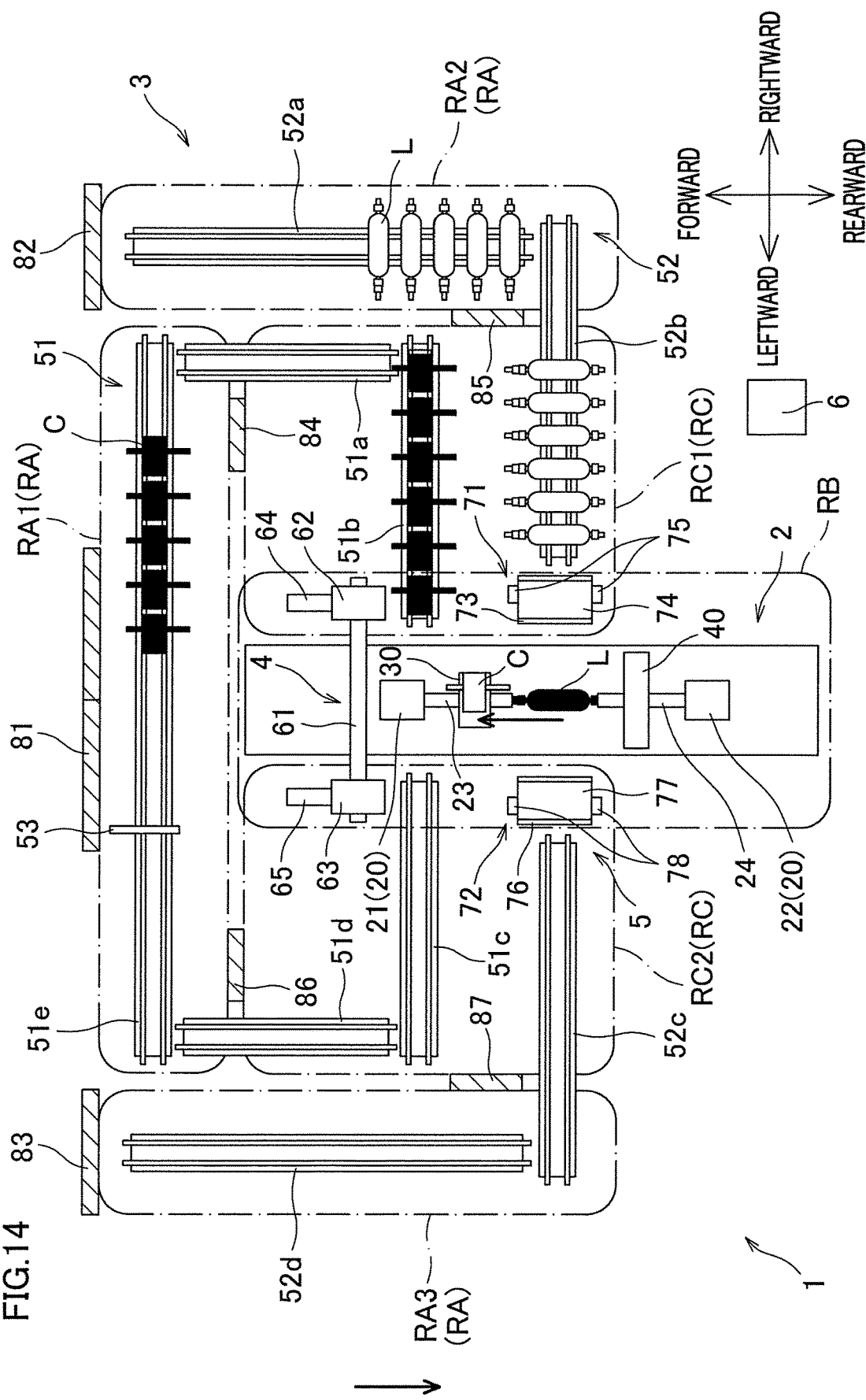
FIG. 14 is a plan view showing a state of the filament winding apparatus.

The following will describe the replacement of the liner L. After the hoop winding unit 30 having finished the hoop-winding is moved forward from the position of the liner L as shown in FIG. 14, the carrying-out carrier 72 of the liner replacing device 5 moves the placement table 77 to the delivery position as shown in FIG. 15. Subsequently, as shown in FIG. 16, the first liner supporting unit 21 and the second liner supporting unit 22 are moved away from the liner L, with the result that the liner L is detached from the liner supporting units 20 and the liner L is placed on the placement table 77. Subsequently, the placement table 77 on which the liner L is placed is moved back to the standby position as shown in FIG. 17, the liner L is moved to the liner carrying-out conveyor 52c by the paired arms 78 as shown in FIG. 18, and then the paired arms 78 are returned as shown in FIG. 19. As a result, the liner L on which the fiber bundles are wound can be carried out from the winder 2 to the liner carrying-out conveyor 52c. After the liner L on which the fiber bundles are wound is carried out, a new liner L is attached by the carrying-in carrier 71 as shown in FIGS. 19 to 22. This process is not explained here because it has already been explained with reference to FIGS. 7 to 10.

Figure 21:
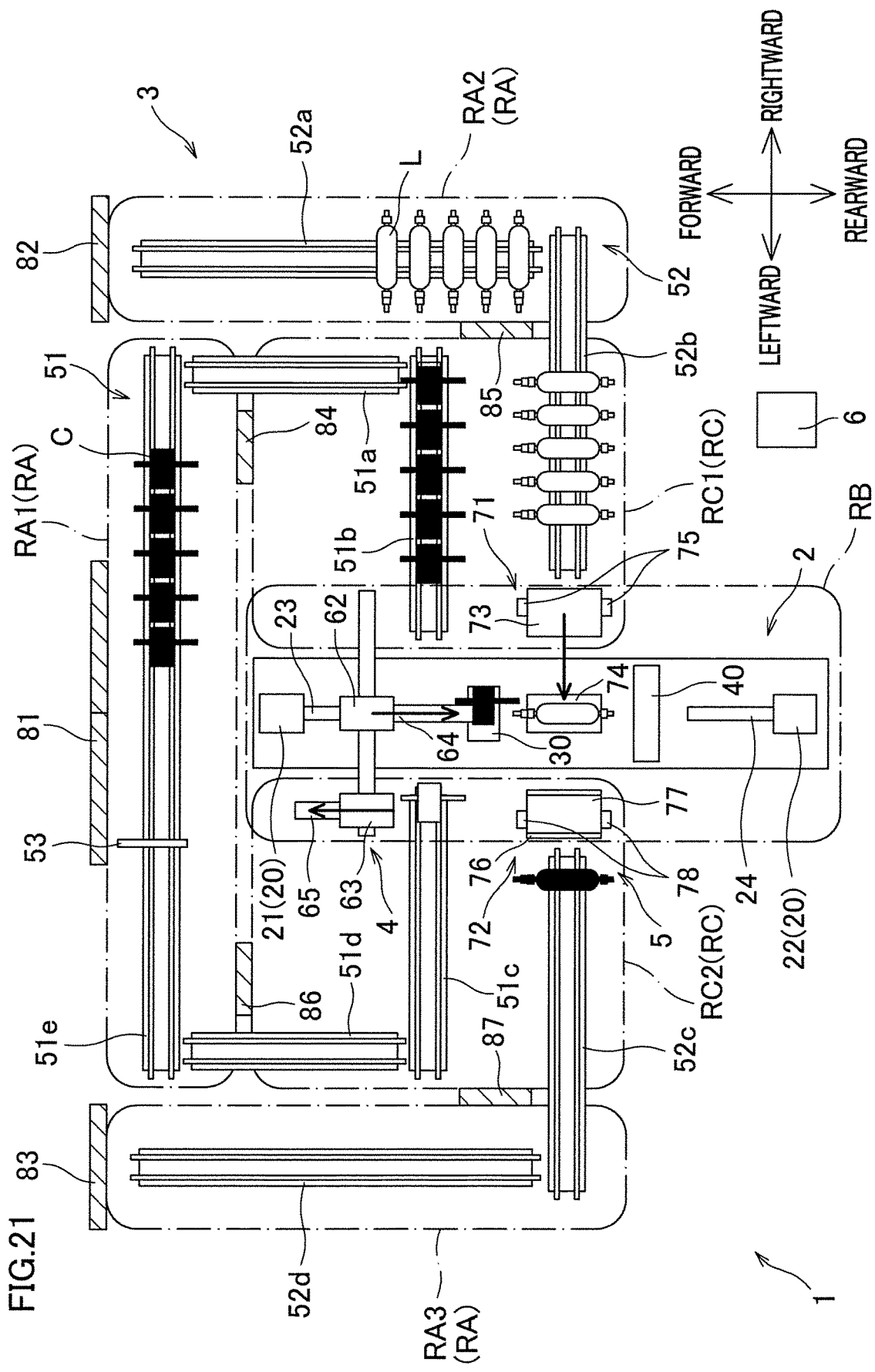
FIG. 21 is a plan view showing a state of the filament winding apparatus.

The following will describe the replacement of the cartridge C. After the hoop winding unit 30 having finished the hoop-winding is moved forward from the position of the liner L as shown in FIG. 14 and the first liner supporting unit 21 and the second liner supporting unit 22 are moved away from the liner L as shown in FIG. 16, the cartridge replacing device 4 moves the slider 63 to the detachment/attachment position as shown in FIG. 17. Subsequently, as shown in FIG. 18, the cartridge C is detached from the hoop winding unit 30 and retained by the carrying-out retaining member 65, as the carrying-out retaining member 65 is moved rearward. Subsequently, the carrying-out retaining member 65 retaining the cartridge C is slightly moved back forward as shown in FIG. 19, the slider 63 is moved to the carrying-out position as show in FIG. 20, and the carrying-out retaining member 65 is moved back further forward as shown in FIG. 21, with the result that the used cartridge C can be carried out from the winder 2 to the cartridge carrying-out conveyor 51c. Partially in parallel to the carrying-out of the used cartridge C, attachment of a new cartridge C is performed as shown in FIGS. 19 to 23. This process is not explained here because it has already been described with reference to FIGS. 7 to 11.

Figure 22:
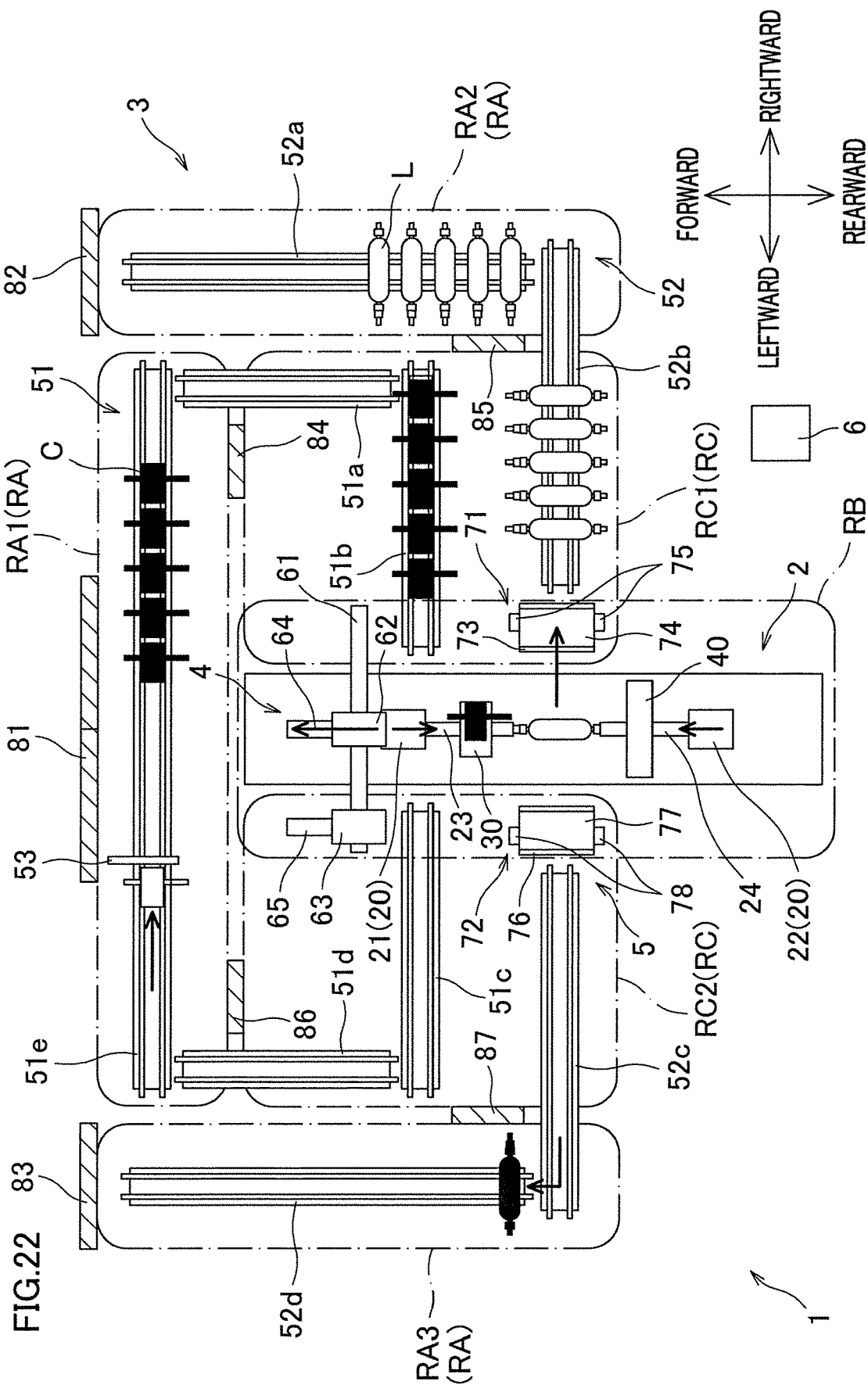
FIG. 22 is a plan view showing a state of the filament winding apparatus.

As shown in FIG. 22, the cartridge C carried out to the cartridge carrying-out conveyor 51c is conveyed to the connection conveyor 51e via the cartridge carrying-out conveyor 51d, and accumulated in the part upstream of the stopper 53. The liner L carried out to the liner carrying-out conveyor 52c is conveyed to the liner carrying-out conveyor 52d and accumulated in the liner carrying-out conveyor 52d.

Figure 23:
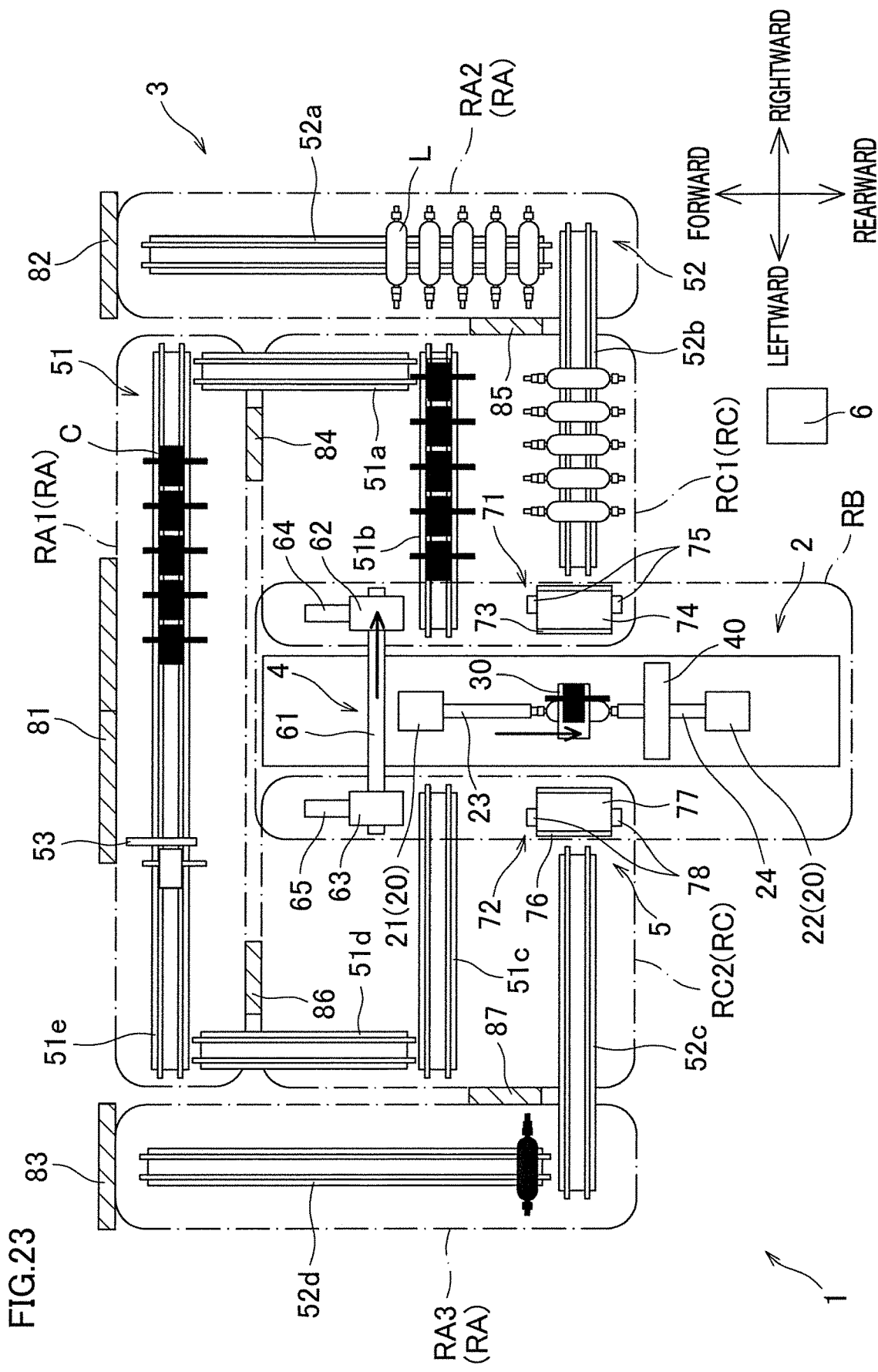
FIG. 23 is a plan view showing a state of the filament winding apparatus.
Figure 24:
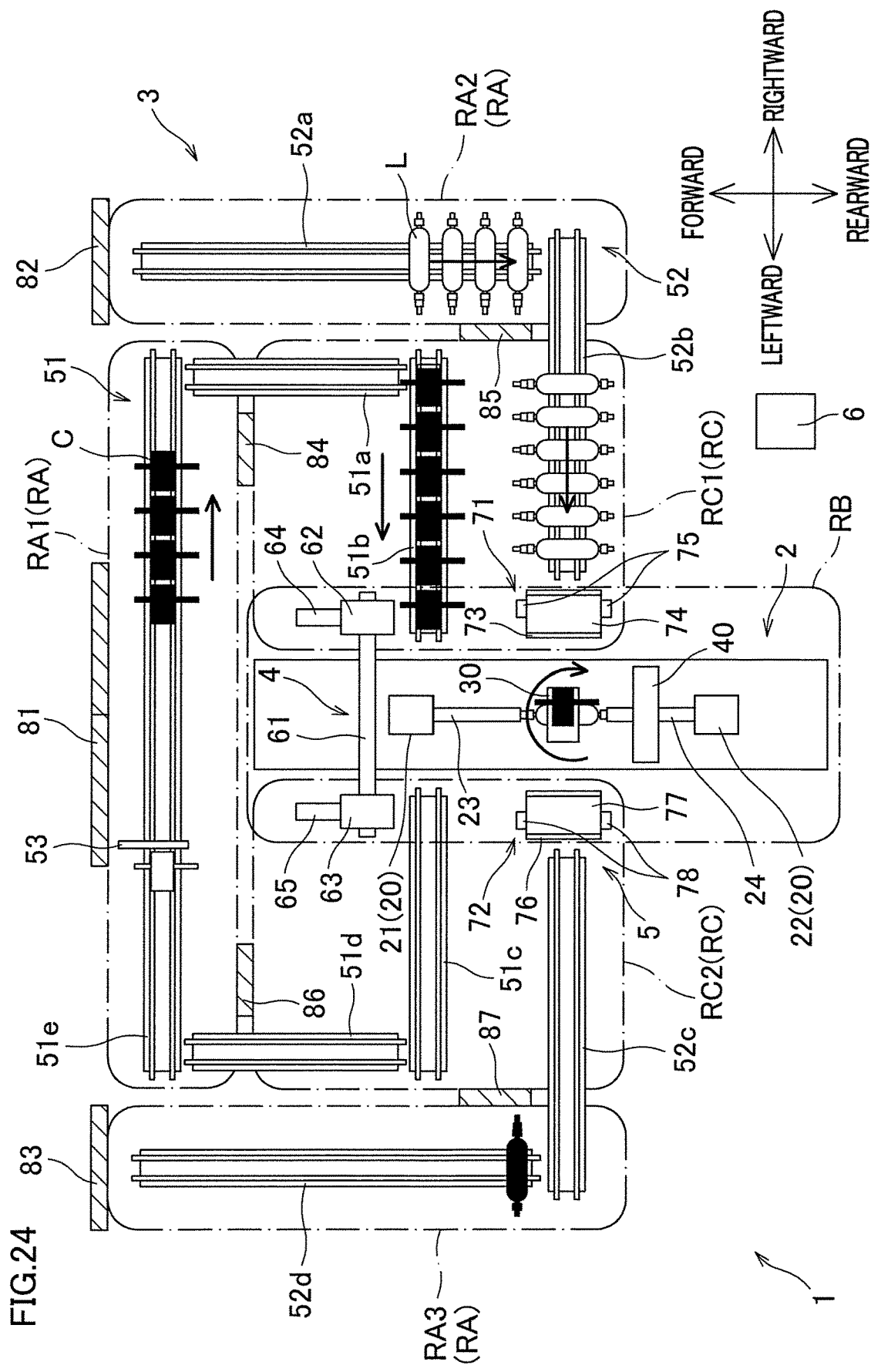
FIG. 24 is a plan view showing a state of the filament winding apparatus.

After replacement of the cartridge C attached to the hoop winding unit 30 and replacement of the liner L attached to the liner supporting units 20, the hoop winding unit 30 is moved to the location where the liner L is provided as shown in FIG. 23, and then hoop-winding by the hoop winding unit 30 starts as shown in FIG. 24. While the hoop-winding is being performed, the cartridges C and the liners L on the carrying-in side are conveyed and gathered on the downstream side.

Figure 25:
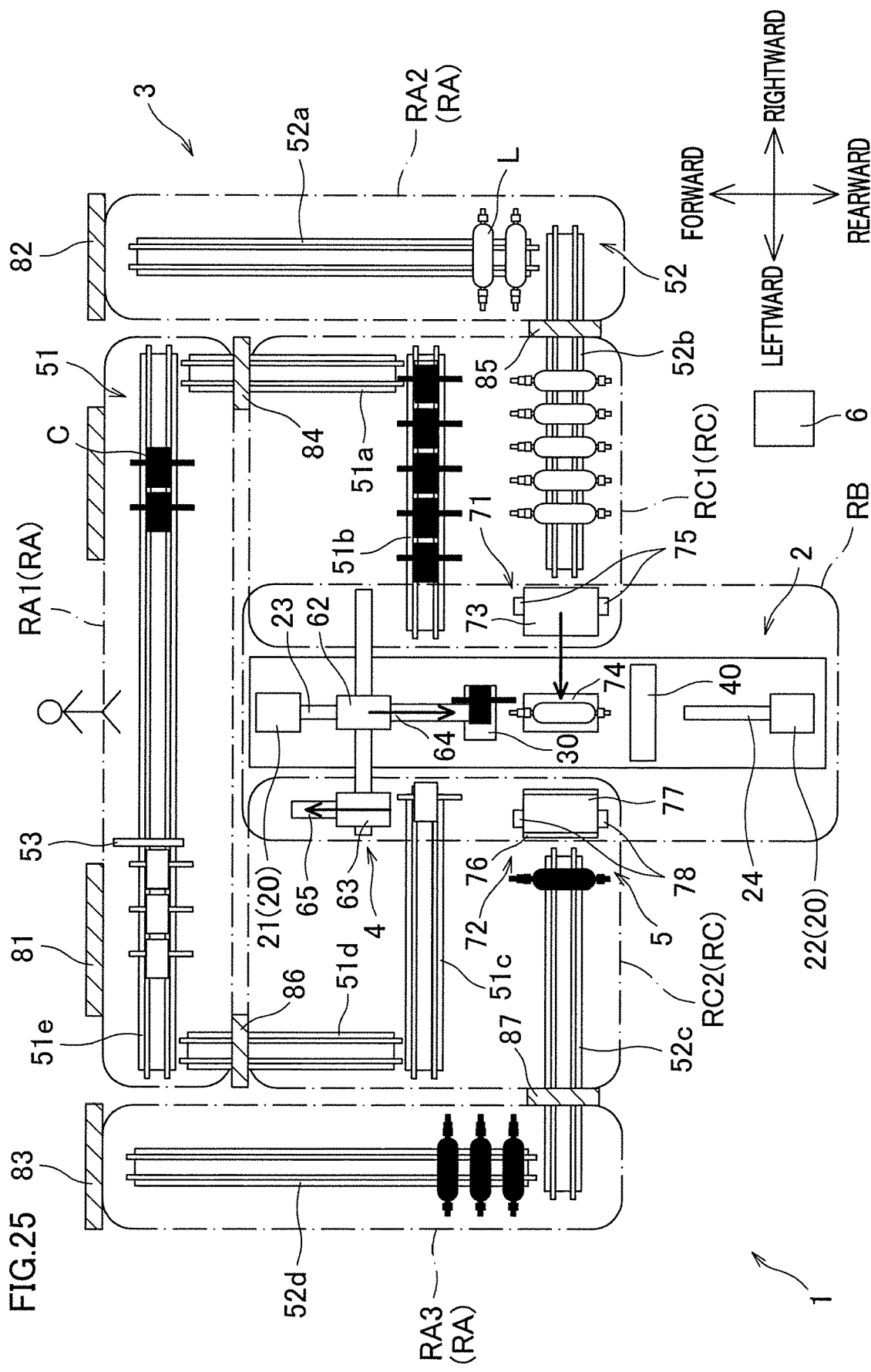
FIG. 25 is a plan view showing a state of the filament winding apparatus.
Figure 26:
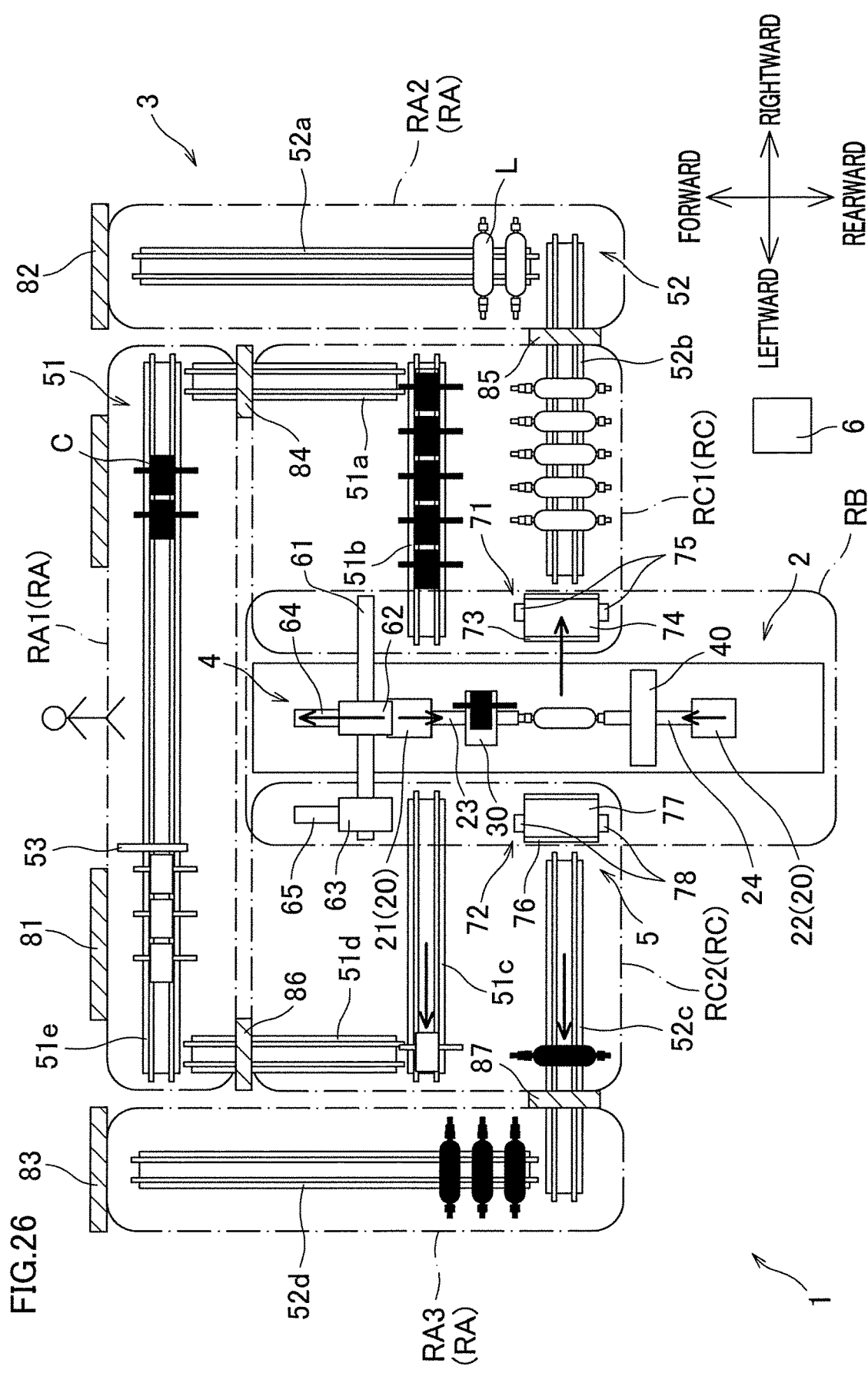
FIG. 26 is a plan view showing a state of the filament winding apparatus.
Figure 27:
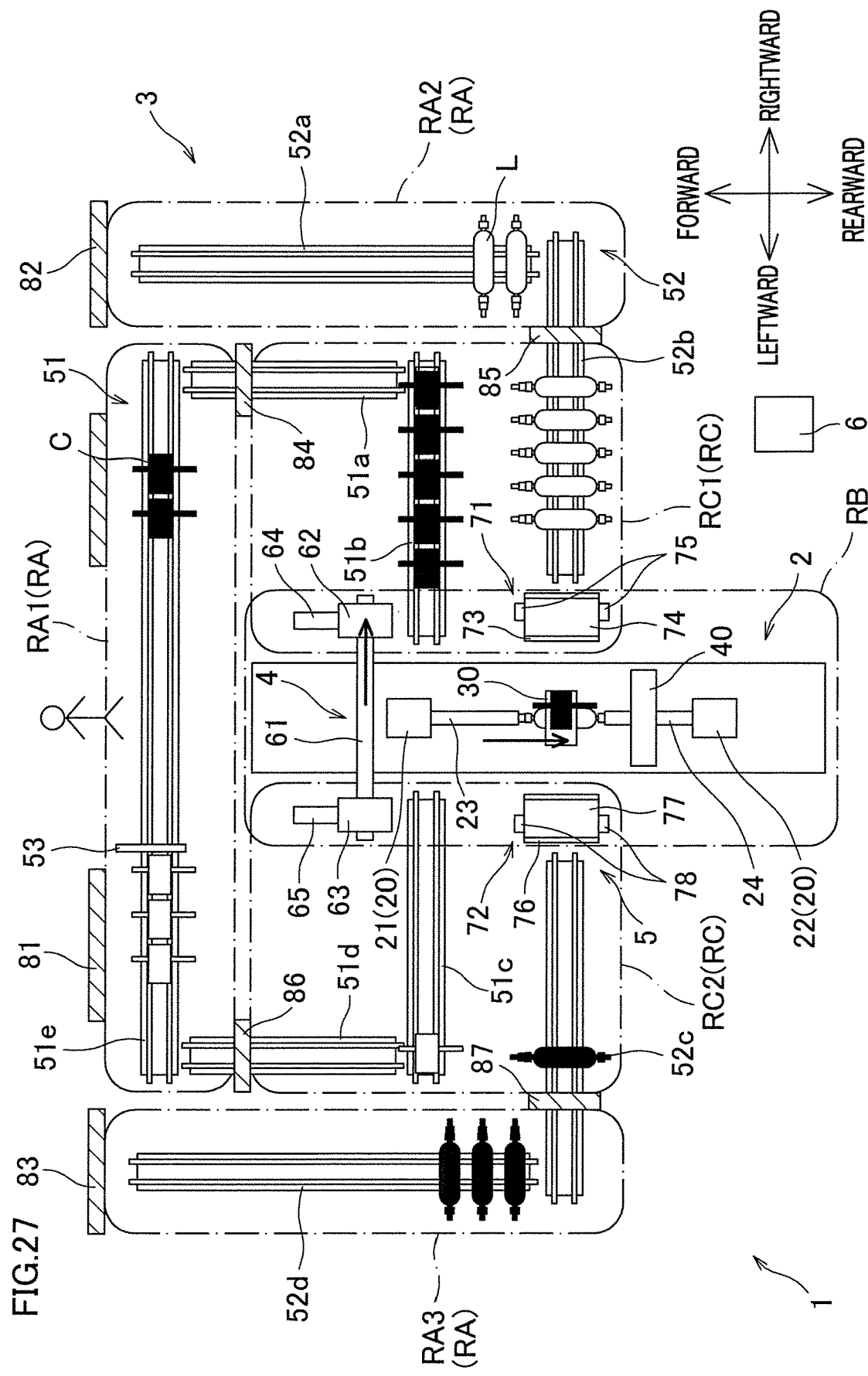
FIG. 27 is a plan view showing a state of the filament winding apparatus.
Figure 28:
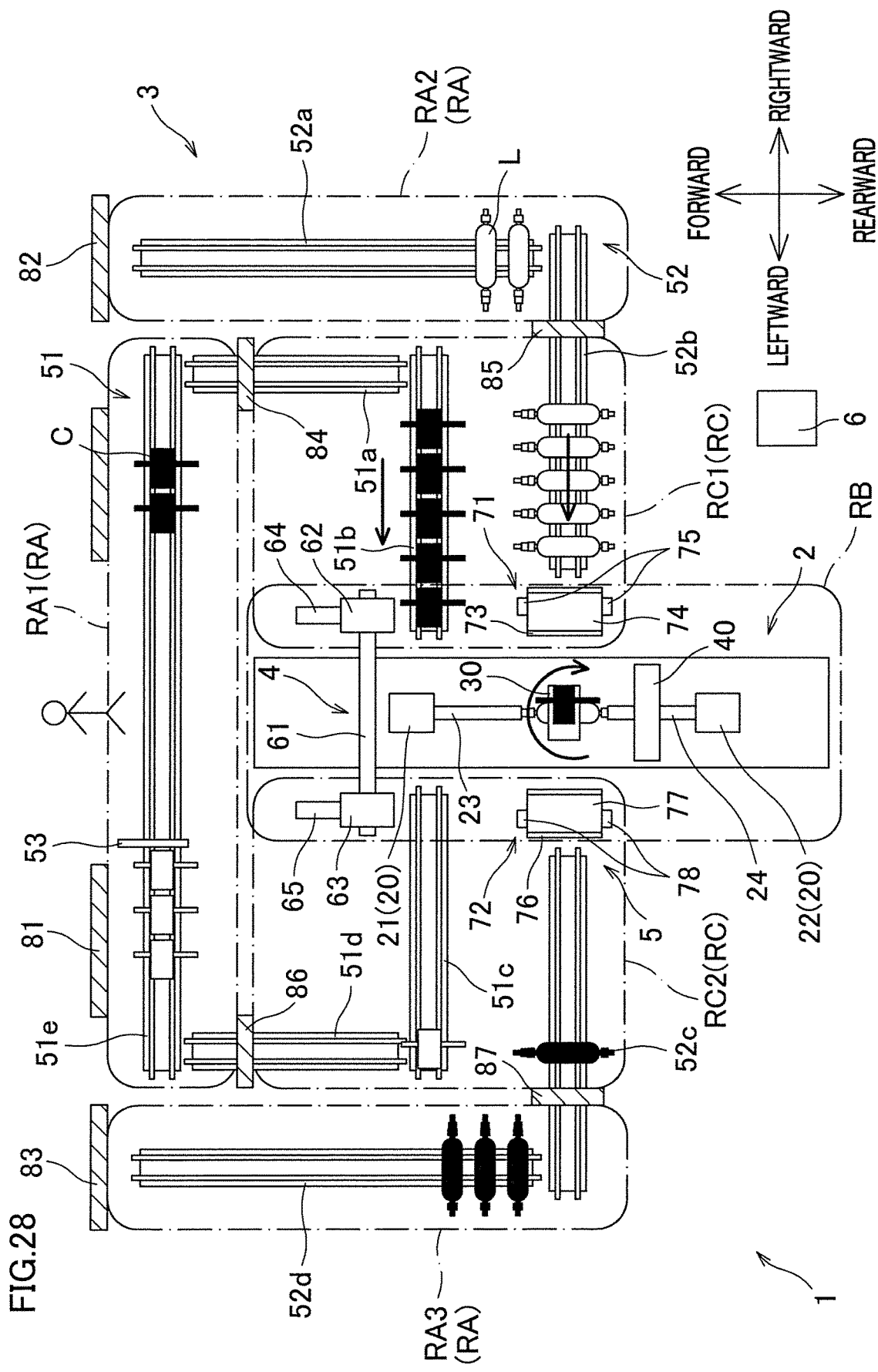
FIG. 28 is a plan view showing a state of the filament winding apparatus.

As described above, in the filament winding apparatus 1, the cartridge C and the liner L can be automatically replaced and winding can be continuously performed. As the winding advances, the used cartridges C are gradually accumulated at the part upstream of the stopper 53 as shown in FIG. 25. As shown in FIGS. 25 to 29, at this stage, the operator opens the door 81 and enters the first working area RA1 at a suitable timing, and performs replacement of the bobbins 33 and yarn threading with respect to the used cartridge C. The flow of this process will be described with reference to FIGS. 25 to 32.

While the operator is performing an operation, the doors 84 and 85 are closed. Hence, a new cartridge C and a new liner L are not conveyed to the winder 2. Even though the supply of the cartridges C and the liners L is stopped for a while, the winding can be continued as shown in FIGS. 25 to 29 because the cartridges C and the liners L are accumulated in the carrying-in buffer area RC1. Furthermore, because the doors 84 and 86 are closed while the operator is performing an operation, the operator cannot enter the buffer area RC through the doors 84 and 86, and hence the safety is improved.

Figure 29:
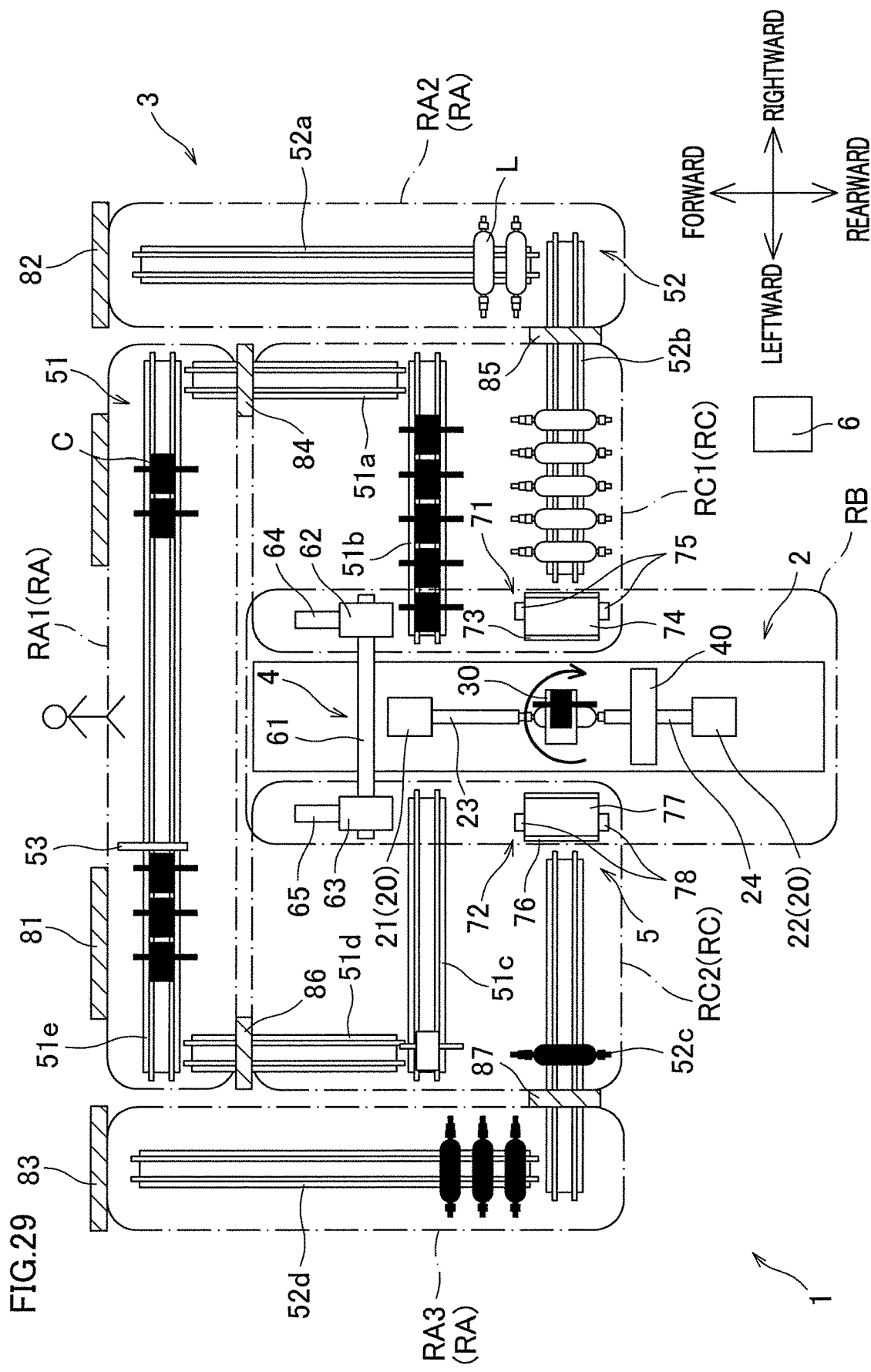
FIG. 29 is a plan view showing a state of the filament winding apparatus.
Figure 30:
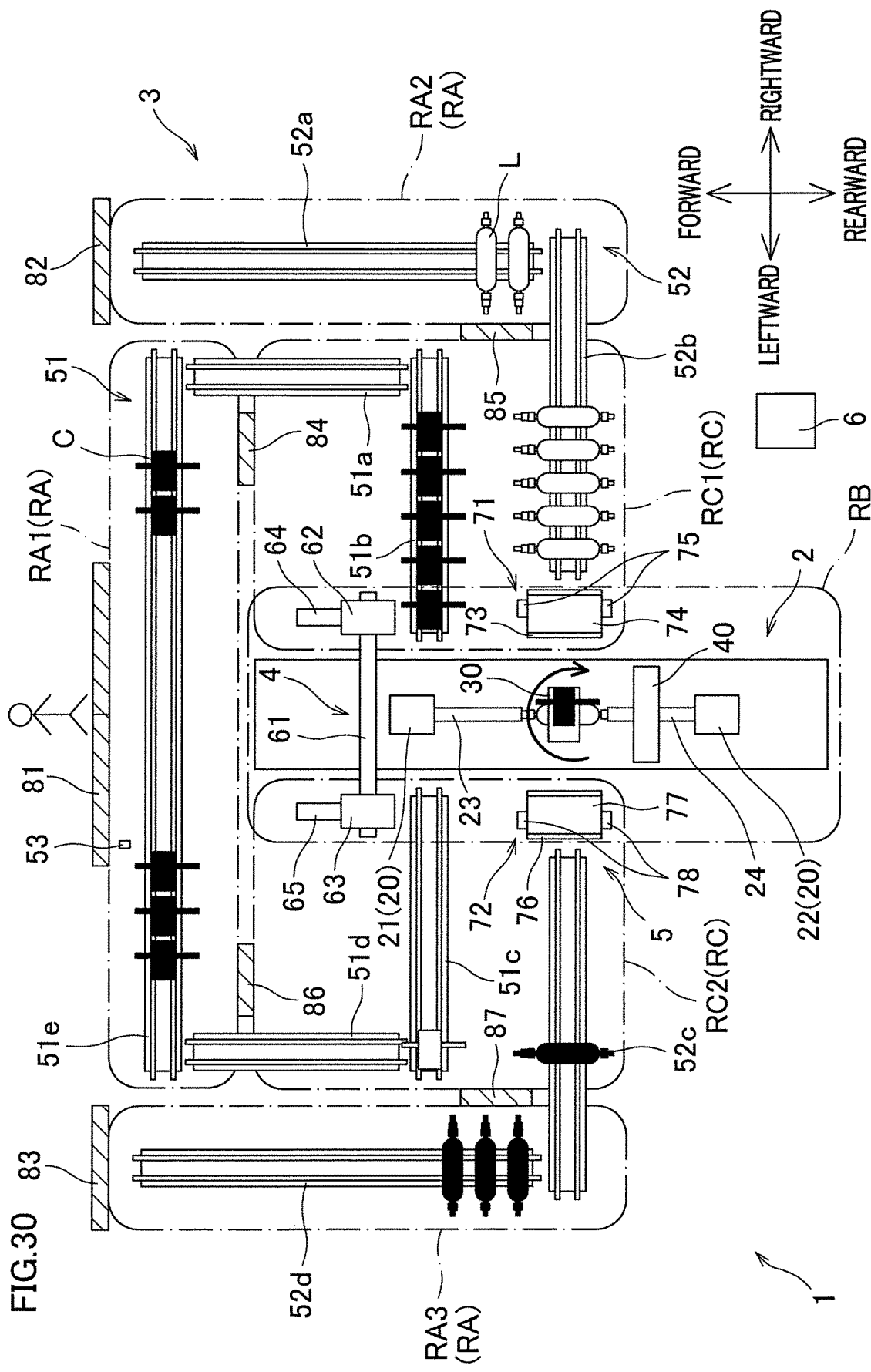
FIG. 30 is a plan view showing a state of the filament winding apparatus.
Figure 31:
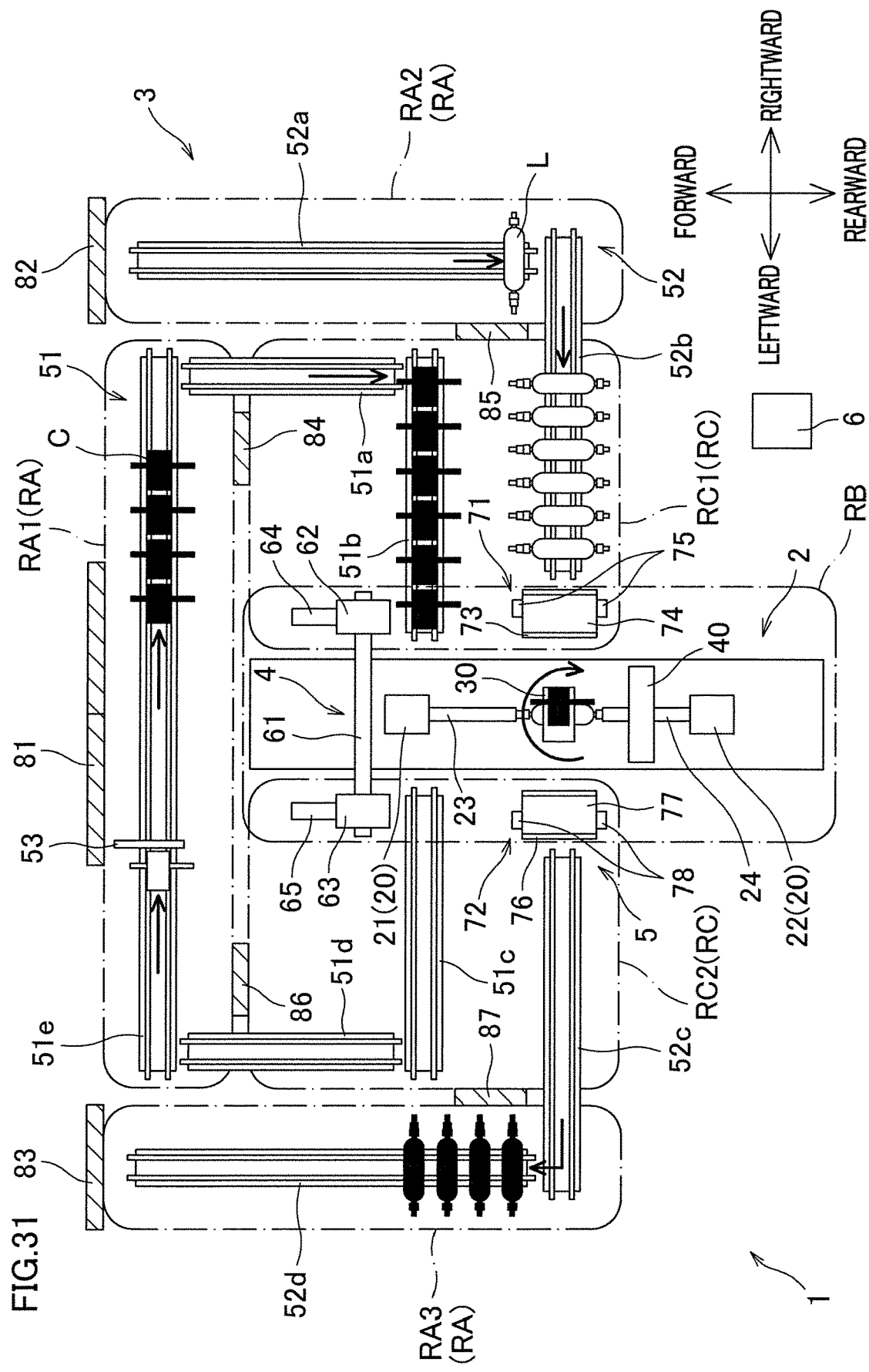
FIG. 31 is a plan view showing a state of the filament winding apparatus.
Figure 32:
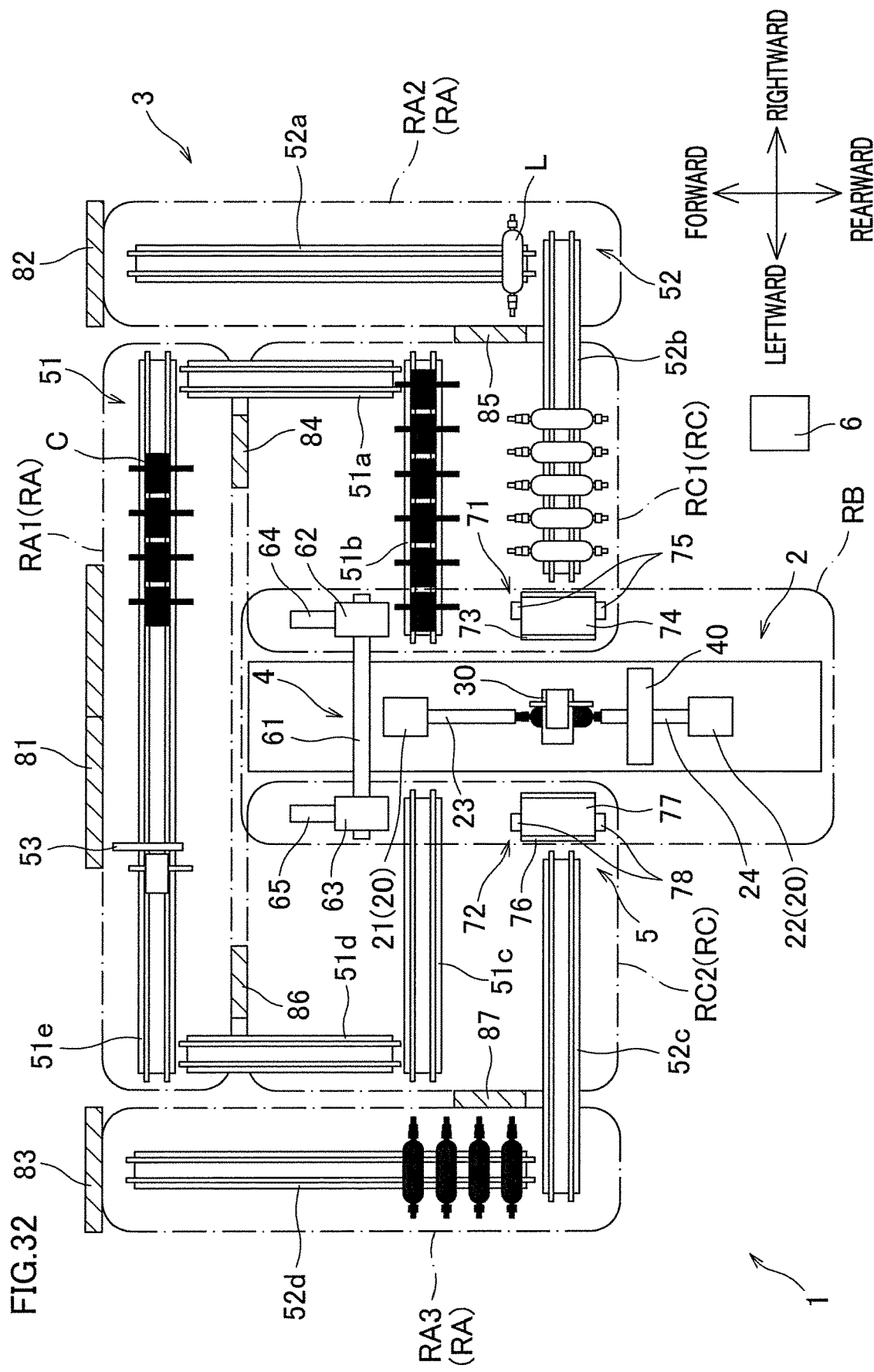
FIG. 32 is a plan view showing a state of the filament winding apparatus.

After replacement of the bobbins 33 and the yarn threading with respect to the used cartridge C are performed as shown in FIG. 29 and the operator goes out from the first working area RA1 and locks the door 81 as shown in FIG. 30, the doors 84 to 87 are opened. As a result of this, the conveyance of the cartridges C and the liners L is resumed as shown in FIG. 31. At this stage, the operator changes the stopper 53 to the open state at a suitable timing. With this, the cartridge C in which replacement of the bobbins 33 has been done and yarn threading has been performed is conveyed. After the cartridge C in which replacement of the bobbins 33 has been done and yarn threading has been performed is conveyed, the stopper 53 is changed back to the blocked state. This change of the stopper 53 may be automatically done by using a sensor or the like which is configured to detect the cartridges C.

Figure 33:
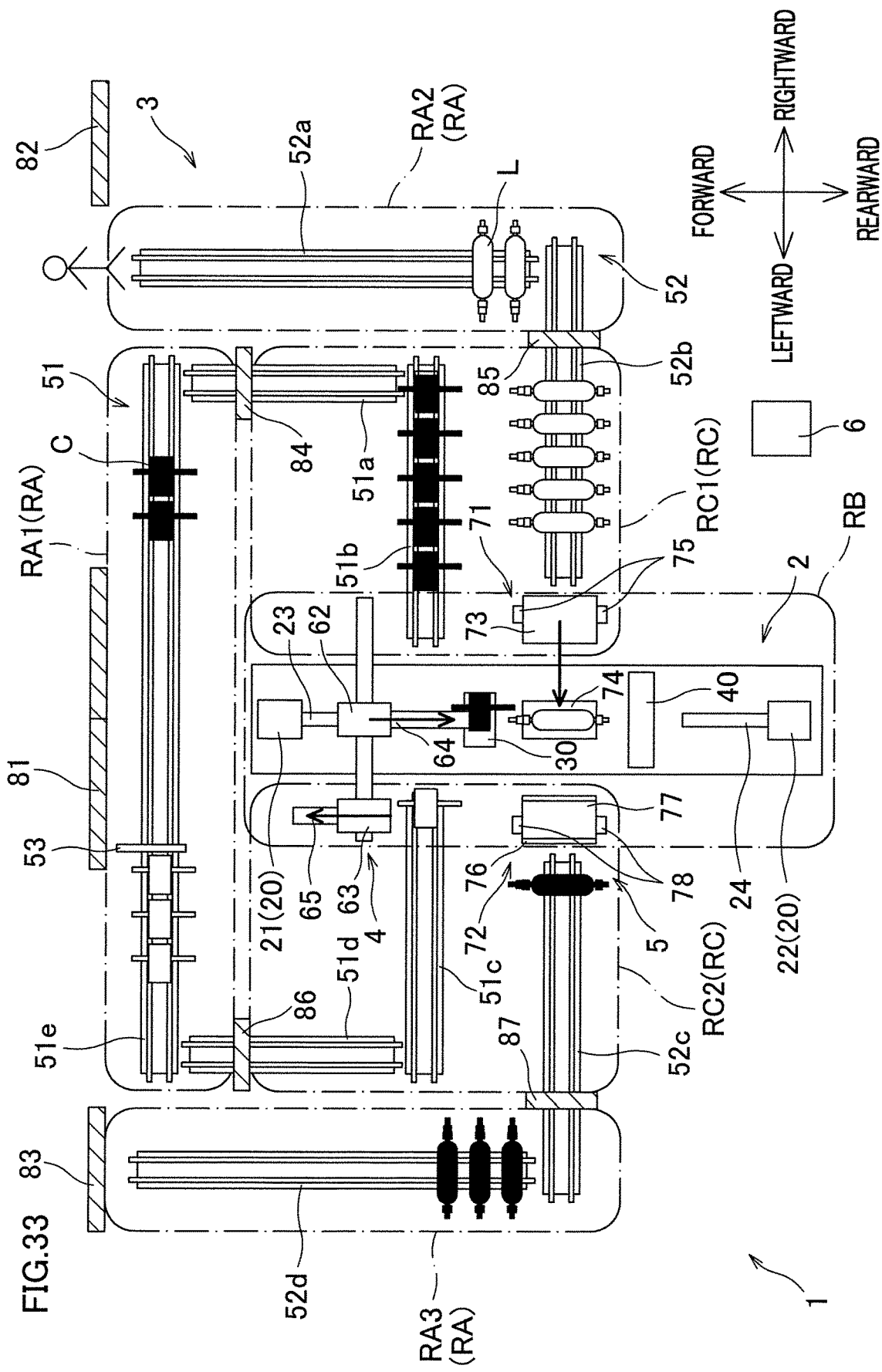
FIG. 33 is a plan view showing a state of the filament winding apparatus.
Figure 34:
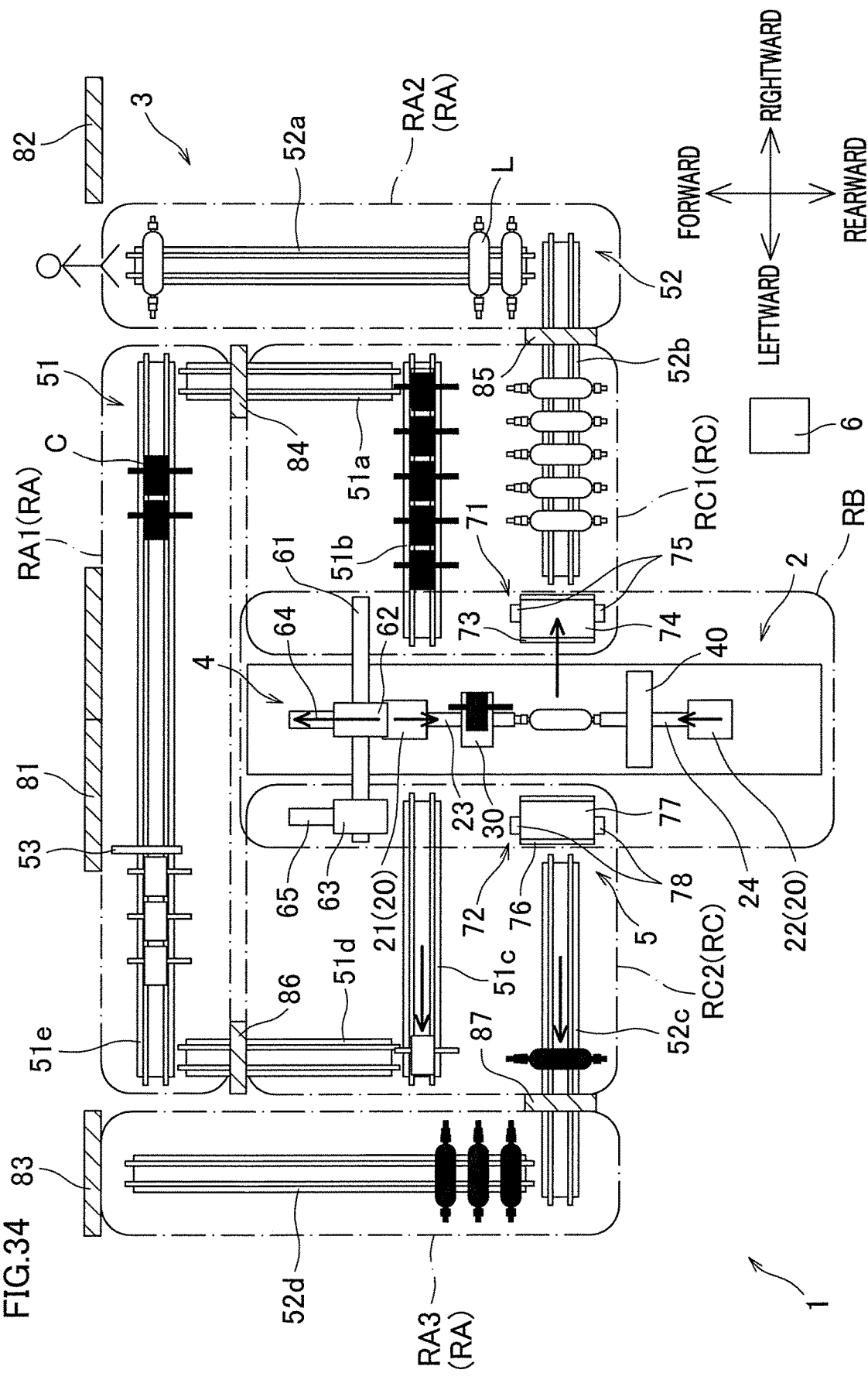
FIG. 34 is a plan view showing a state of the filament winding apparatus.
Figure 35:
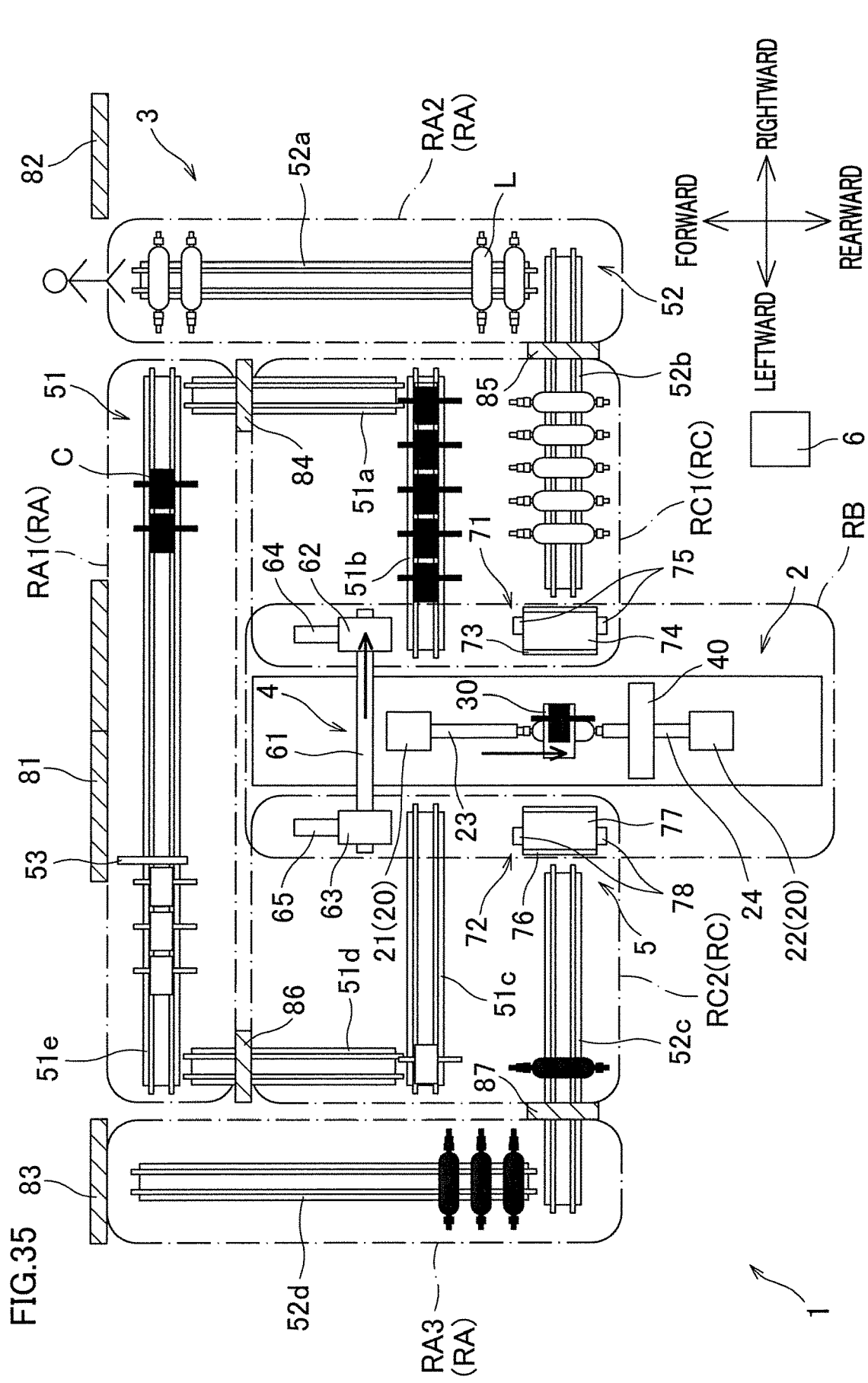
FIG. 35 is a plan view showing a state of the filament winding apparatus.
Figure 36:
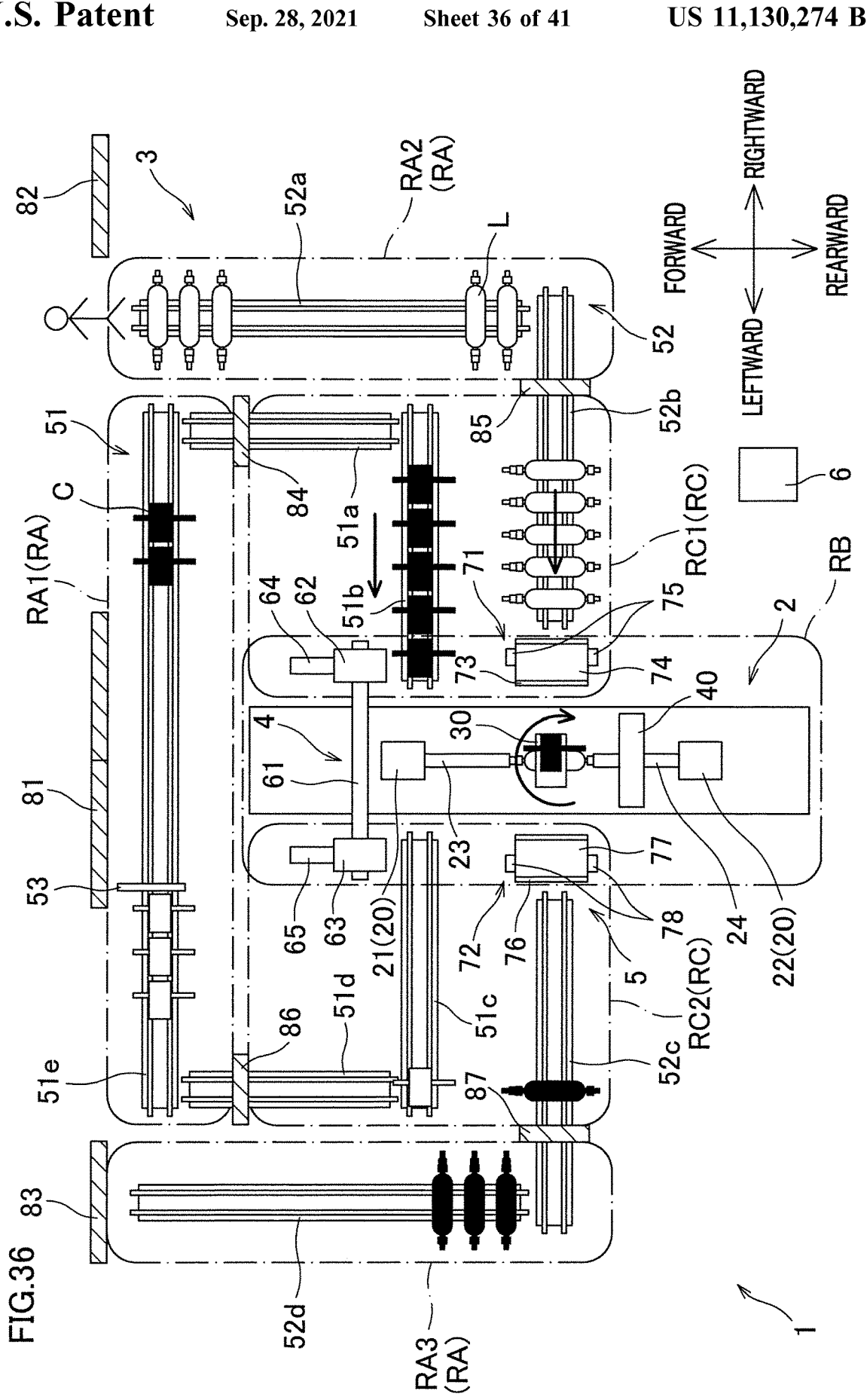
FIG. 36 is a plan view showing a state of the filament winding apparatus.

Furthermore, as the winding advances, the number of the liners L on the liner carrying-in conveyor 52a decreases as shown in FIG. 33. As shown in FIGS. 33 to 36, at this stage, the operator opens the door 82 and enters the second working area RA2 at a suitable timing, and carries the liners L into the liner carrying-in conveyor 52a. The flow of this process will be described with reference to FIGS. 33 to 39.

While the operator is performing an operation, the doors 84 and 85 are closed and hence new cartridges C and new liners L are not conveyed to the winder 2. Even though the supply of the cartridges C and the liners L is stopped for a while, the winding can be continued as shown in FIGS. 33 to 36 because the cartridges C and the liners L are accumulated in the carrying-in buffer area RC1. Furthermore, because the door 85 is closed while the operator is performing an operation, the operator cannot enter the buffer area RC through the door 85, and hence the safety is improved.

Figure 37:
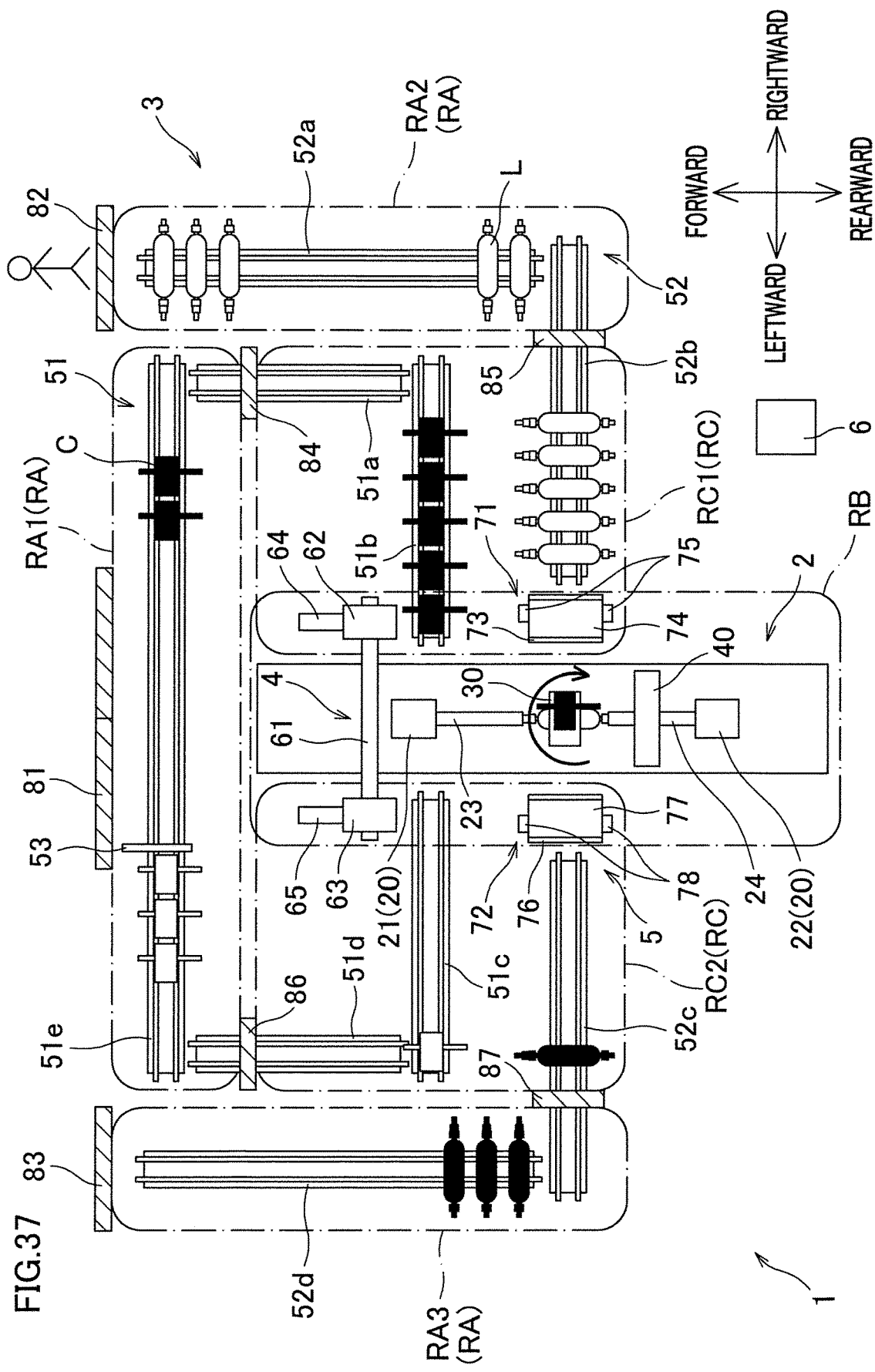
FIG. 37 is a plan view showing a state of the filament winding apparatus.
Figure 38:
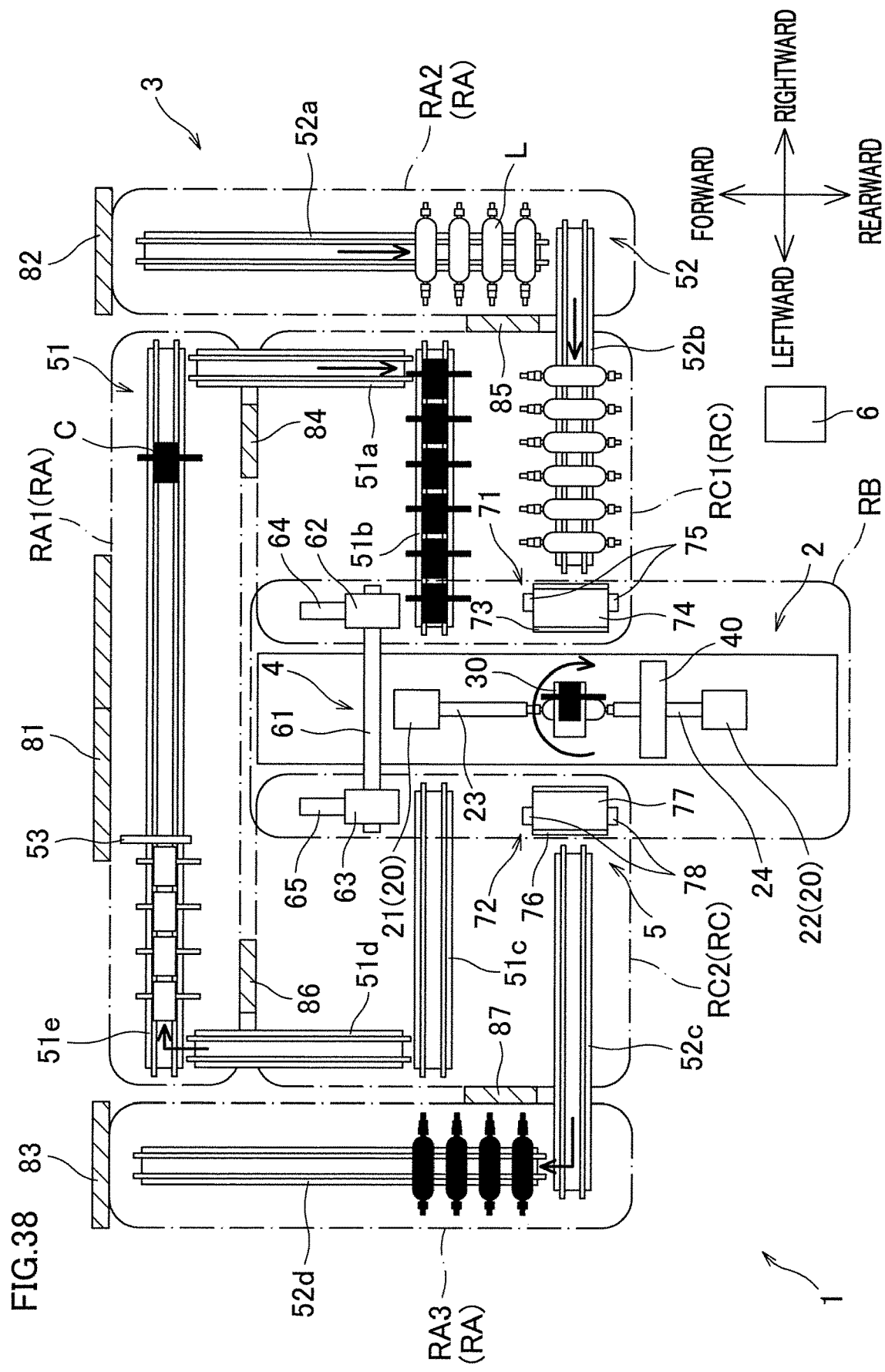
FIG. 38 is a plan view showing a state of the filament winding apparatus.
Figure 39:
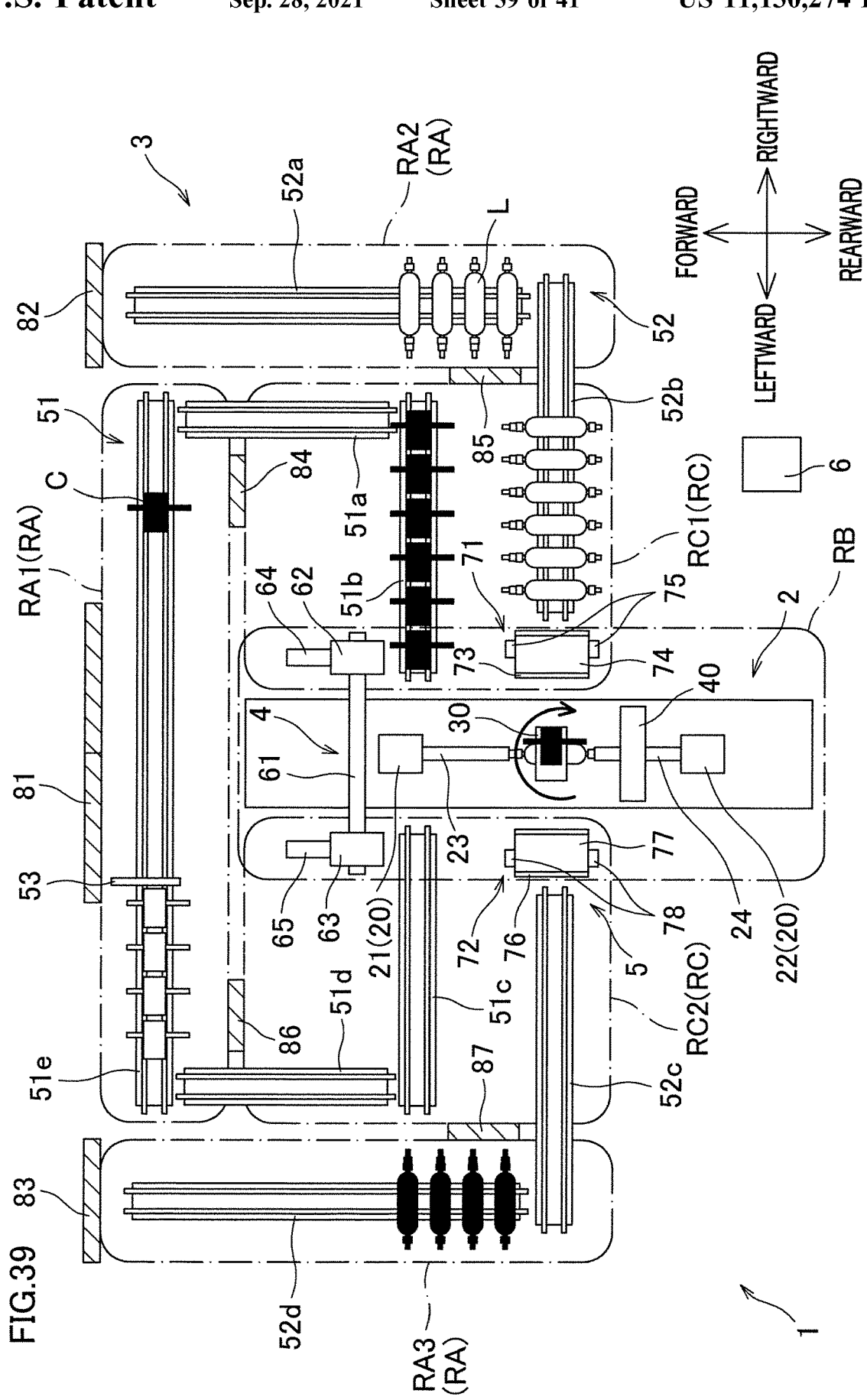
FIG. 39 is a plan view showing a state of the filament winding apparatus.

When a new liner L is carried in and the operator goes out from the second working area RA2 and locks the door 82 as shown in FIG. 37, the doors 84 to 87 are opened. As a result of this, the conveyance of the cartridges C and the liners L is resumed as shown in FIG. 38.

Although not detailed, the process of carrying the liner L on which the fiber bundles are wound out from the liner carrying-out conveyor 52d by the operator is more or less identical with the above-described process of carrying in the new liner L. That is to say, even when the operator is performing an operation in the third working area RA3, the winding can be continued because the cartridges C and the liners L are accumulated in the carrying-in buffer area RC1, and the safety is improved because the door 87 is closed.

As described above, in the filament winding apparatus 1 of this example, when the winder 2 is stopped due to maintenance and the like, the operator is allowed to enter the operation area RB and the buffer area RC from the working area RA through the doors 84 to 87 (first doors). Meanwhile, because the first safety fences 7 (first fixed fences) are provided, it is possible to prevent the operator from carelessly entering the operation area RB and the buffer area RC from the working area RA while the winder 2 is in operation. Because it is possible to prevent the operator from approaching the winder 2 in operation, the safety of the operator is ensured. Furthermore, because in the buffer area RC an accumulator portion (a part of the cartridge conveyance path 51 and a part of the liner conveyance path 52, which are in the buffer area RC) is provided to be able to accumulate the cartridges C (bobbins 33) and the liners L, the winding can be continued by using the cartridges C and the liners L accumulated in the accumulator portion, even when the operator is performing an operation in the working area RA. This makes it possible to achieve both safety of the operator and improvement in efficiency of the winding.

In this example, the second safety fences 8 (second fixed fences) and the doors 81 to 83 (second doors) are provided at the borders between the working area RA and the outside area. In this example, the doors 81 to 83 must be opened when the operator enters the working area RA from the outside area. Safety is therefore further improved by properly controlling the doors 84 to 87 in accordance with the states of the doors 81 to 83.

In this example, the operation unit 9 (unlocking operation unit) operated by the operator to open the doors 81 to 83 and the controller 6 (control unit) configured to control the doors 84 to 87 and the doors 81 to 83 are further provided. When unlocking is instructed to the operation unit 9, the controller 6 unlocks the doors 81 to 83 whereas locks the doors 84 to 87. With this arrangement, after the operator unlocks the doors 81 to 83 and enters the working area RA, the doors 84 to 87 are locked and the operator cannot enter the buffer area RC from the working area RA. This ensures prevention of the operator from entering the buffer area RC while the winder 2 is in operation.

In this example, the operation unit 9 (locking operation unit) operated by the operator from the outside area to lock the doors 81 to 83 is further provided. The controller 6 maintains the doors 84 to 87 in the locked state during a period from a locking instruction to the operation unit 9 to an unlocking instruction to the operation unit 9. With this arrangement, the doors 84 to 87 are not unlocked unless the operator goes out from the working area RA to the outside area and instructs locking to the operation unit 9. This further ensures prevention of the operator from entering the buffer area RC while the winder 2 is in operation.

In this example, the winder 2 detachably supports the cartridge C to which the bobbins 33 are attached, and the conveyance device 3 carries the cartridge C in and out from the winder 2. In this way, when the cartridge C to which the bobbins 33 are attached is replaced altogether, the replacement of the bobbins 33 can be done in a short time.

In this example, the size of the opening of each doors 84 to 87 in the open state is arranged to allow at least one of the cartridge C and the liner L to pass through the door. With this arrangement, when the cartridge C or the liner L is large in size, the doors 84 to 87 are not only used to convey the cartridges C and the liners L from the working area RA to the buffer area RC, but also to allow the operator to go in and out.

In this example, fiber bundles are wound onto a liner L used as a hydrogen tank mounted on a fuel cell vehicle. Because the hydrogen tank is mounted on the fuel cell vehicle, the liner L is required to be large to some degree. Hence, the winder 2 and the conveyance device 3 are large in size. Safety is therefore important, and our apparatus by which high level safety is achieved is particularly effective.

Other Examples

The following will describe modifications of the above-described example.

In the example above, the stopper 53 is provided on the connection conveyor 51e. The stopper 53 may be omitted on condition that, for example, the cartridge conveyance path 51 is properly controlled so that used cartridges C are not conveyed to the winder 2.

While in the example above the doors 84 to 87 are all locked when at least one of the doors 81 to 83 is unlocked, the disclosure is not limited to this arrangement. For example, only the doors 84 and 86 facing the first working area RA1 may be locked when the door 81 is opened, only the door 85 facing the second working area RA2 may be locked when the door 82 is opened, and only the door 87 facing the third working area RA3 may be locked when the door 83 is opened.

To further improve safety, for example, the connection conveyor 51e may be stopped when the door 81 is opened, the liner carrying-in conveyor 52a may be stopped when the door 82 is opened, and the liner carrying-out conveyor 52d may be stopped when the door 83 is opened.

In the example above, instructions to unlock and lock the doors 81 to 83 are made through the operation unit 9 which is formed of a touch panel. The operation unit 9 may be arranged differently. For example, an unlocking switch for unlocking the doors 81 to 83 and a locking switch for locking the doors 81 to 83 may be independently provided.

In the example above, the second safety fences 8 and the doors 81 to 83 are provided at the borders between the working area RA and the outside area, and opening/closing control of the doors 84 to 87 is performed in accordance with the open/close states of the doors 81 to 83. Alternatively, as shown in FIG. 41, the second safety fences 8 and the doors 81 to 83 may be replaced with a human detection sensor 89 (human detection unit) which is able to detect the operator in the working area RA. In the example shown in FIG. 41, a human detection sensor 89 formed of an area sensor is provided in each of the working areas RA1 to RA3. The human detection sensor 89 is not necessarily formed of the area sensor, and may be formed of another type of sensor such as a motion sensor and a thermal sensor, on condition that the operator is detectable.

When the human detection sensor 89 detects that the operator is in the working area RA, the controller 6 locks the doors 84 to 87. In this example, it is not prerequisite to lock all of the doors 84 to 87. For example, when it is detected that the operator is in the first working area RA1, only the doors 84 and 86 facing the first working area RA1 may be locked. As such, by using the human detection sensor 89, it is possible to ensure prevention of the operator from entering the buffer area RC from the working area RA while the winder 2 is in operation. The human detection sensor 89 may be provided in addition to the second safety fences 8 and the doors 81 to 83 which are provided as in the example above.

The invention claimed is:

1. A filament winding apparatus comprising:
a winder that detachably supports at least one bobbin on each of which a fiber bundle is wound and configured to wind the fiber bundle taken out from the bobbin onto a liner; and
a conveyance device including a conveyance path through which the at least one bobbin and the liner are carried in and out from the winder,
in the filament winding apparatus, a working area in which an operator performs an operation to the at least one bobbin and/or the liner on the conveyance path,
an operation area in which the winder is driven,
a buffer area between the working area and the operation area in a conveyance direction on the conveyance path, and
an outside area that is neither the working area, the operation area, nor the buffer area being provided,
the filament winding apparatus further comprising:
first fixed fences provided at borders between (i) the operation area and the buffer area and (ii) the working area and at the borders between (I) the operation area and the buffer area and (II) the outside area; and
a first door provided at a border between the working area and the buffer area, and wherein
the buffer area includes an accumulator portion capable of accumulating the at least one bobbin and the liner.

2. The filament winding apparatus according to claim 1, wherein a second fixed fence and a second door are provided at a border between the working area and the outside area.

3. The filament winding apparatus according to claim 2, further comprising:
an unlocking operation unit operated by the operator to unlock the second door; and
a control unit configured to control the first door and the second door, wherein,
when the unlocking operation unit is operated, the control unit unlocks the second door and locks the first door.

4. The filament winding apparatus according to claim 3, further comprising a locking operation unit operated by the operator from the outside area to lock the second door, wherein
the control unit maintains the first door in a locked state during a period after operation of the unlocking operation unit and before operation of the locking operation unit.

5. The filament winding apparatus according to claim 1, further comprising a human detection unit capable of detecting the operator in the working area.

6. The filament winding apparatus according to claim 5, further comprising a control unit configured to control the first door, wherein,
when the human detection unit detects that the operator is in the working area, the control unit locks the first door.

7. The filament winding apparatus according to claim 1, wherein
the winder detachably supports a cartridge to which a plurality of the at least one bobbin are attached, and
the conveyance device carries the cartridge in and out from the winder.

8. The filament winding apparatus according to claim 7, wherein the first door in an open state is sized to allow at least one of the cartridge or the liner to pass through the first door.

9. The filament winding apparatus according to claim 1, wherein the fiber bundle is wound onto the liner that is used as a hydrogen tank mounted on a fuel cell vehicle.

10. The filament winding apparatus according to claim 2, further comprising a human detection unit capable of detecting the operator in the working area.

11. The filament winding apparatus according to claim 3, further comprising a human detection unit capable of detecting the operator in the working area.

12. The filament winding apparatus according to claim 4, further comprising a human detection unit capable of detecting the operator in the working area.

13. The filament winding apparatus according to claim 2, wherein
the winder detachably supports a cartridge to which a plurality of the at least one bobbin are attached, and
the conveyance device carries the cartridge in and out from the winder.

14. The filament winding apparatus according to claim 3, wherein
the winder detachably supports a cartridge to which a plurality of the at least one bobbin are attached, and
the conveyance device carries the cartridge in and out from the winder.

15. The filament winding apparatus according to claim 4, wherein
the winder detachably supports a cartridge to which a plurality of the at least one bobbin are attached, and
the conveyance device carries the cartridge in and out from the winder.

16. The filament winding apparatus according to claim 5, wherein
the winder detachably supports a cartridge to which a plurality of the at least one bobbin are attached, and
the conveyance device carries the cartridge in and out from the winder.

17. The filament winding apparatus according to claim 6, wherein
the winder detachably supports a cartridge to which a plurality of the at least one bobbin are attached, and
the conveyance device carries the cartridge in and out from the winder.

18. The filament winding apparatus according to claim 2, wherein the fiber bundle is wound onto the liner that is used as a hydrogen tank mounted on a fuel cell vehicle.

19. The filament winding apparatus according to claim 3, wherein the fiber bundle is wound onto the liner that is used as a hydrogen tank mounted on a fuel cell vehicle.

20. The filament winding apparatus according to claim 4, wherein the fiber bundle is wound onto the liner that is used as a hydrogen tank mounted on a fuel cell vehicle.

* * * * *